United States Patent
Marumoto

(10) Patent No.: US 7,920,294 B2
(45) Date of Patent: Apr. 5, 2011

(54) DATA PROCESSING METHOD, DATA PROCESSING APPARATUS, METHOD FOR GENERATING DITHER PATTERN, AND DITHER PATTERN

(75) Inventor: Yoshitomo Marumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 684 days.

(21) Appl. No.: 11/618,979

(22) Filed: Jan. 2, 2007

(65) Prior Publication Data

US 2007/0109604 A1    May 17, 2007

Related U.S. Application Data

(63) Continuation of application No. PCT/JP2005/012513, filed on Jul. 6, 2005.

(30) Foreign Application Priority Data

Jul. 6, 2004 (JP) .................. 2004-199623
Jul. 6, 2005 (JP) .................. 2005-197874

(51) Int. Cl.
*G06K 15/00* (2006.01)
*H04N 1/40* (2006.01)
*H04N 1/405* (2006.01)

(52) U.S. Cl. ............... 358/3.22; 358/3.13; 358/3.14; 358/3.21; 358/3.24

(58) Field of Classification Search .............. 358/1.9, 358/3.01, 3.06, 3.13, 3.21, 3.22, 3.24, 3.26, 358/3.14

See application file for complete search history.

(56) References Cited

U.S. PATENT DOCUMENTS

| 5,111,310 A | 5/1992 | Parker et al. |
| 5,323,247 A | 6/1994 | Parker et al. |

(Continued)

FOREIGN PATENT DOCUMENTS

JP    08-160602 A    6/1996

(Continued)

OTHER PUBLICATIONS

T. Mitsa and K. J. Parker, "Digital Halftoning using a Blue Noise Mask", Proc. IEEE 1452, pp. 47-56 (1991).

(Continued)

*Primary Examiner* — James A Thompson
(74) *Attorney, Agent, or Firm* — Fitzpatrick, Cella, Harper & Scinto

(57) ABSTRACT

There is provided a dither pattern capable of reducing deterioration in image quality caused due to beading by suppressing the occurrence of grains in printing images using a plurality of color inks. If among threshold dots, for which repulsive force potentials are totalized, a threshold dot Do has the largest total, a change in repulsive force potential is obtained between before and after the movement of dot Do. The threshold dot Do is moved to a dot with the smallest total of repulsive force potentials between before and after its movement. By repeating this process, the total energy of all the three planes can be reduced, achieving a dot distribution, in which the number of low frequency components is reduced and the dots are appropriately dispersed, for superposed dither patterns.

7 Claims, 32 Drawing Sheets

U.S. PATENT DOCUMENTS

| | | | |
|---|---|---|---|
| 5,341,228 A | 8/1994 | Parker et al. | |
| 5,477,305 A | 12/1995 | Parker et al. | |
| 5,535,020 A | 7/1996 | Ulichney | |
| 5,726,772 A | 3/1998 | Parker et al. | |
| 5,815,286 A | 9/1998 | Matsuba et al. | |
| 6,356,363 B1 * | 3/2002 | Cooper et al. | 358/1.9 |
| 6,394,612 B1 | 5/2002 | Yano | |
| 6,476,934 B1 * | 11/2002 | Ilbery et al. | 358/3.04 |
| 2007/0097164 A1 | 5/2007 | Marumoto | |

FOREIGN PATENT DOCUMENTS

| | | |
|---|---|---|
| JP | 2622429 | 4/1997 |
| JP | 11-150652 | 6/1999 |
| JP | 2001-298617 | 10/2001 |
| JP | 2003-125219 A | 4/2003 |
| JP | 2003-202848 A | 7/2003 |

OTHER PUBLICATIONS

International Preliminary Report on Patentability—Appln. No. PCT/JP2005/012513, International Bureau of WIPO, Jan. 25, 2007.

Office Action—Appln. No. 2005-197874, Japanese Patent Office, May 21, 2010 (along with English-language translation).

* cited by examiner

LAYER DITHER
LAYER DITHER PATTERN
M ONLY

LAYER DITHER
LAYER DITHER PATTERN
C+M+Y
AVERAGE THRESHOLDS

LAYER DITHER (DISPLACED AND SUPERPOSED)
LAYER DITHER PATTERN
C+M
AVERAGE THRESHOLDS

LAYER DITHER (DISPLACED AND SUPERPOSED)
LAYER DITHER PATTERN
C+M+Y
AVERAGE THRESHOLDS

IN THE CASE SINGLE DITHERS ARE DISPLACED
CONVENTIONAL DITHER PATTERNS
C+M
AVERAGE THRESHOLDS

IN THE CASE SINGLE DITHERS ARE DISPLACED
CONVENTIONAL DITHER PATTERNS
C+M+Y
AVERAGE THRESHOLDS

UNIFORM IMAGE IN A DENSITY OF 64
IS BINARIZED WITH CONVENTIONAL DITHER PATTERNS
LOGICAL PRODUCTS OF C+M

UNIFORM IMAGE IN A DENSITY OF 64
IS BINARIZED WITH CONVENTIONAL DITHER PATTERNS
LOGICAL PRODUCTS OF C+M
(DITHER PATTERNS ARE DISPLACED
FROM EACH OTHER AT ONE PIXEL TO NEXT PIXEL)

UNIFORM IMAGE IN A DENSITY OF 64
IS BINARIZED WITH LAYER DITHER PATTERNS
C+M+Y
SUPERPOSING

DATA PROCESSING METHOD, DATA PROCESSING APPARATUS, METHOD FOR GENERATING DITHER PATTERN, AND DITHER PATTERN

TECHNICAL FIELD

The present invention relates to a method and an apparatus for processing data, a method for generating a dither pattern, and a dither pattern, and specifically to a dithering process for quantizing image data and a dither pattern used therein.

BACKGROUND ART

In printers including an ink jet printer, dot printing data for forming a plurality of ink dots constituting a printed image is generally generated by means of, for example, quantizing 8-bit image data to individual binary image data of 1-bit. As one of methods for this type of quantization, a dither processing is known. The use of the methods disclosed in Patent Documents 1 and 2 provides patterns, in which thresholds are well dispersed. When using such patterns for quantization, the binary image data with less noise feeling and high dispersiveness can be obtained. The dithering method, which can process data at a higher speed than that of an error diffusion method, is suitable for processing data for high-speed printers, requiring high-speed performance, and multi-color printers, requiring processing a lot of data.

Patent Document 1: Japanese Patent No. 2622429
Patent Document 2: U.S. Pat. No. 5,5350,200 Specification

DISCLOSURE OF THE INVENTION

Recently, as ink jet printing systems have been improved in their high processing speed and density, as well as diversification of the kind of allowed inks, the amount of ink supplied per unit hour or supplied per unit area of a printing medium tends to increase. For this reason, a problem of beading has increasingly become severer. Beading may cause unevenness on printed images when ink droplets not absorbed by a printing medium come in contact with adjacent ones each other to form a beading pattern on the printing medium.

To successfully reduce beading, it is important to arrange inks applied within a short time at different positions, as much as possible. To achieve this, it has been effective that dither patterns as different as possible are used for the individual colors of ink. This makes it possible to reduce the probability of landing of different color inks on the same place.

Even though, however, using a different dither pattern for each color of ink, beading cannot be reduced to a satisfactory extent.

FIGS. 32(a) to 32(c) are views explaining this problem. These figures show that in a certain scan in multi-path printing, inks land on a print medium in order of cyan, magenta, and yellow. As shown in FIG. 32(a), a cyan ink is ejected first to the print medium in which no ink has landed. At this time, the positions where the cyan inks landed of course are consistent with the arrangement of dots of a dither pattern used. Thus before the ink has been completely absorbed by the print medium, cyan ink droplets 10C are present on the print medium in an arrangement consistent with the dither pattern. Then, as shown in FIG. 32(b), a magenta ink is similarly ejected to the print medium at positions consistent with a corresponding dither pattern, and ink droplets 10M are similarly formed before absorption. Here, depending on the relationship between the arrangements of the dots in the dither patterns for the cyan and magenta inks, the cyan ink droplets 10C and magenta ink droplets 10M may contact and connect to one another to form ink droplets 10B (shown by x in the figure). Moreover, as shown in FIG. 32(c), a yellow ink is similarly ejected to the print medium at positions consistent with the corresponding dither pattern, and ink droplets 10Y are similarly formed before absorption. Also in this case, depending on the relationship between the arrangements of the dots in the dither patterns for the respective inks, connected ink droplets 10B (shown by x in the figure) are formed. As further scans are executed to increase the ratio of ink droplets to pixels, ink droplets may overlap the same pixel to form similar connected ink droplets.

Thus, if sequentially ejected ink droplets are applied to pixels adjacent or close to each other, or to the same pixel, they contact and attract one another by their surface tensions, and then two or three (or more) ink droplets join together to form a large droplet 10B (also referred as grain). Once such a grain is formed, the next ink droplet applied to an adjacent or close position is likely to be attracted to that grain. That is, successively applied droplets aggregate together and gradually grow around an initially formed grain, which serves as a core, into a larger grain. In a uniform image area, in particular, these grains fixed on a printing medium are irregularly scattered, which are visualized as beadings.

Close or adjacent arrangement of dots causing the grain produced in the middle of the printing depends on a quantized data arrangement pattern, which has inherently been assigned to the quantized image data. In brief, according to a threshold pattern of a dither pattern, the arrangement of the quantized data is determined in its corresponding image data plane.

The dithering process or dither patterns disclosed in the Patent Document 1 can not help solve the problem of grain occurrence described with reference to FIGS. 32(a) to 32(c). This means that in the case of the dither patterns disclosed in Patent Document 1, different dither patterns may be applied to different colors of ink. In this case, the dither patterns are unintentionally assigned to the different colors of ink. For this reason, this type of dithering has a disadvantage in that printing dots with different colors of ink are arranged at low dispersiveness, causing the dots to inevitably come to adjacent to or even overlap each other in an image during segment-printing (intermediately-processed images).

The present invention has been made for aiming at solving the abovementioned problem and an object thereof is to provide a method and an apparatus for processing data, a method for generating a dither pattern, and a dither pattern, which can suppress the occurrence of grains during data printing using a plurality of different colors of ink to reduce deterioration in image quality due to beading.

In the first aspect of the present invention, there is provided a method for generating plural dither patterns that are used to generate print data that causes plural types of dots constituting a printed image to be formed, said method comprising: a step of determining an arrangement of threshold values in each of the plural dither patterns corresponding to the plural types of dots, wherein said step includes a step of determining an arrangement of the threshold values so that low frequency components that are defined by the arrangement of the threshold values in each of the plural dither patterns decrease together in the plural dither patterns.

In the second aspect of the present invention, there is provided a method for generating plural dither patterns that are used for quantization, said method comprising: a step of determining an arrangement of the threshold values in the dither pattern, wherein said step includes a step that changes a first condition of a threshold value distribution and a second condition of a threshold value distribution in each of the dither patterns determines the arrangement of the threshold values so that low frequency components that are defined by the arrangement of the threshold values decrease together in the plural dither patterns when changing the first condition into the second condition.

In the third aspect of the present invention, there is provided a data processing method of performing a quantizing process for generating print data for plural type of dots by using plural dither patterns, wherein the plural dither patterns are patterns in which low frequency components defined on a pattern of averages of the threshold values in respective threshold pixels corresponding to each other in two or more superposed dither patterns are fewer than that of a pattern of averages of the threshold values in respective threshold pixels corresponding to each other in two or more dither patterns superposed at displaced position.

In the fourth aspect of the present invention, there is provided a data processing apparatus performing a quantizing process for generating print data for plural type of dots by using plural dither patterns, wherein the plural dither patterns are patterns in which low frequency components defined on a pattern of averages of the threshold values in respective threshold pixels corresponding to each other in two or more superposed dither patterns are fewer than that of a pattern of averages of the threshold values in respective threshold pixels corresponding to each other in two or more dither patterns superposed at displaced position.

In the fifth aspect of the present invention, there is provided plural dither patterns used for a quantizing process for generating print data for plural type of dots, wherein the plural dither patterns are patterns in which low frequency components defined on a pattern of averages of the threshold values in respective threshold pixels corresponding to each other in two or more superposed dither patterns are fewer than that of a pattern of averages of the threshold values in respective threshold pixels corresponding to each other in two or more dither patterns superposed at displaced position.

According to the configuration mentioned above, deterioration in image quality induced by beading produced due to grains formed in the middle of printing can be reduced.

Further features of the present invention will become apparent from the following description of exemplary embodiments (with reference to the attached drawings).

BEST MODE FOR CARRYING OUT THE INVENTION

Embodiments of the present invention will be in detail described below with reference to the accompanying drawings.

The embodiments of the present invention relate to a method for generating a dither pattern and the dither pattern for generating binary image data used for multi-pass printing.

Figure 1:
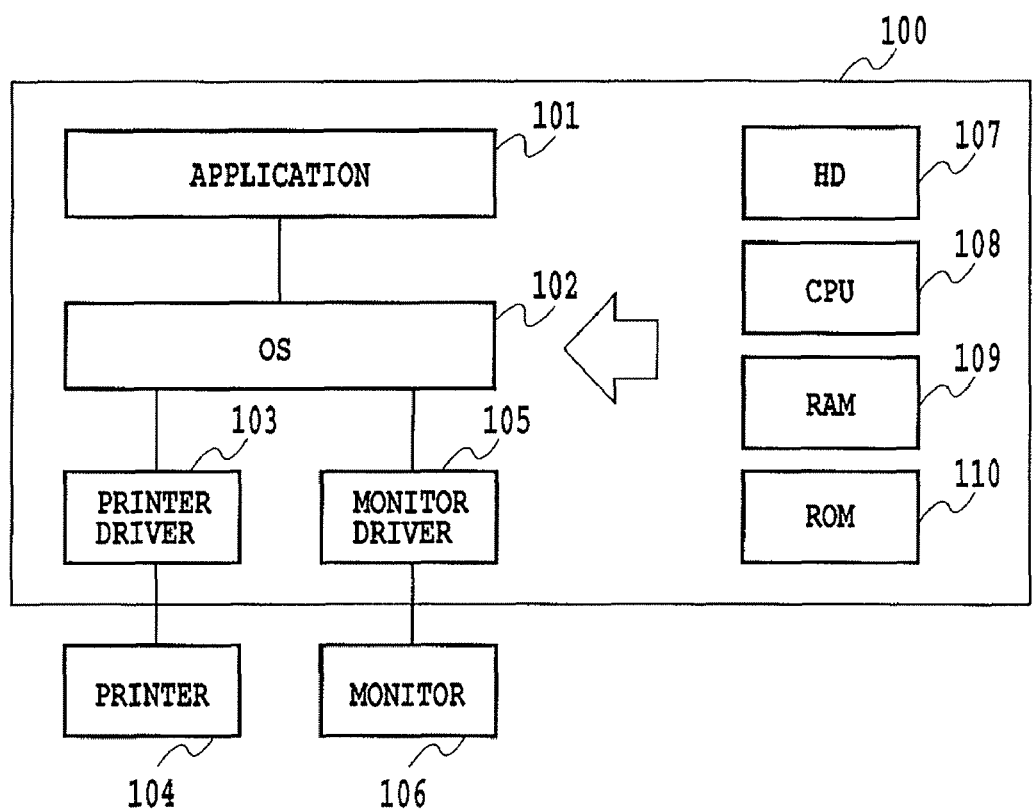
FIG. 1 is a block diagram mainly showing a hardware and software configuration of a PC, which serves as an image-processing device according to one embodiment of the present invention.

FIG. 1 is a block diagram showing the configuration of hardware and software in a personal computer (hereinafter also simply referred to as a PC) that functions as a host apparatus according to an embodiment of the present invention. The host apparatus generates image data that is printed by a printer 104.

In FIG. 1, the PC 100, which serves as a host computer, operates software including application software 101, a printer driver 103, and a monitor driver 105 under the control of an operating system (OS) 102. The application software 101 executes processes related to word processing, table calculation, and an Internet browser. The monitor driver 105 executes processes such as generation of image data that is displayed on a monitor 106.

The printer driver 103 processes a group of various drawing instructions (image drawing instruction, text drawing instruction, graphics drawing instruction, and the like) that are issued to the OS 102 by the application software 101. The printer driver 103 thus generates binary image data that is finally used by the printer 104. Specifically, the printer driver 103 executes image processing described later with reference to FIG. 2 to generate binary image data on plural ink colors for use in the printer 104.

The host computer 100 comprises a CPU 108, a hard disk (HD) 107, a RAM 109, and a ROM 110 as hardware for operating the above software. More specifically, the CPU 108 executes processing in accordance with the above software programs stored in the hard disk 107 and ROM 110. The RAM 119 is used as a work area for the processing.

The printer 104 according to the present embodiment is of what is called a serial type which scans pint heads that eject ink over a print medium and ejects inks from the print heads while the scanning with the print head to perform printing. The print heads are provided for respective inks C, M, Y, and K and installed on a carriage so as to be scanned over the print media such as print sheets. Each of the print heads has an ejection opening arrangement density of 1,200 dpi and ejects 3.0 pico-liters of ink droplets through each of the ejection openings. Each print head has 512 ejection openings.

Figure 2:
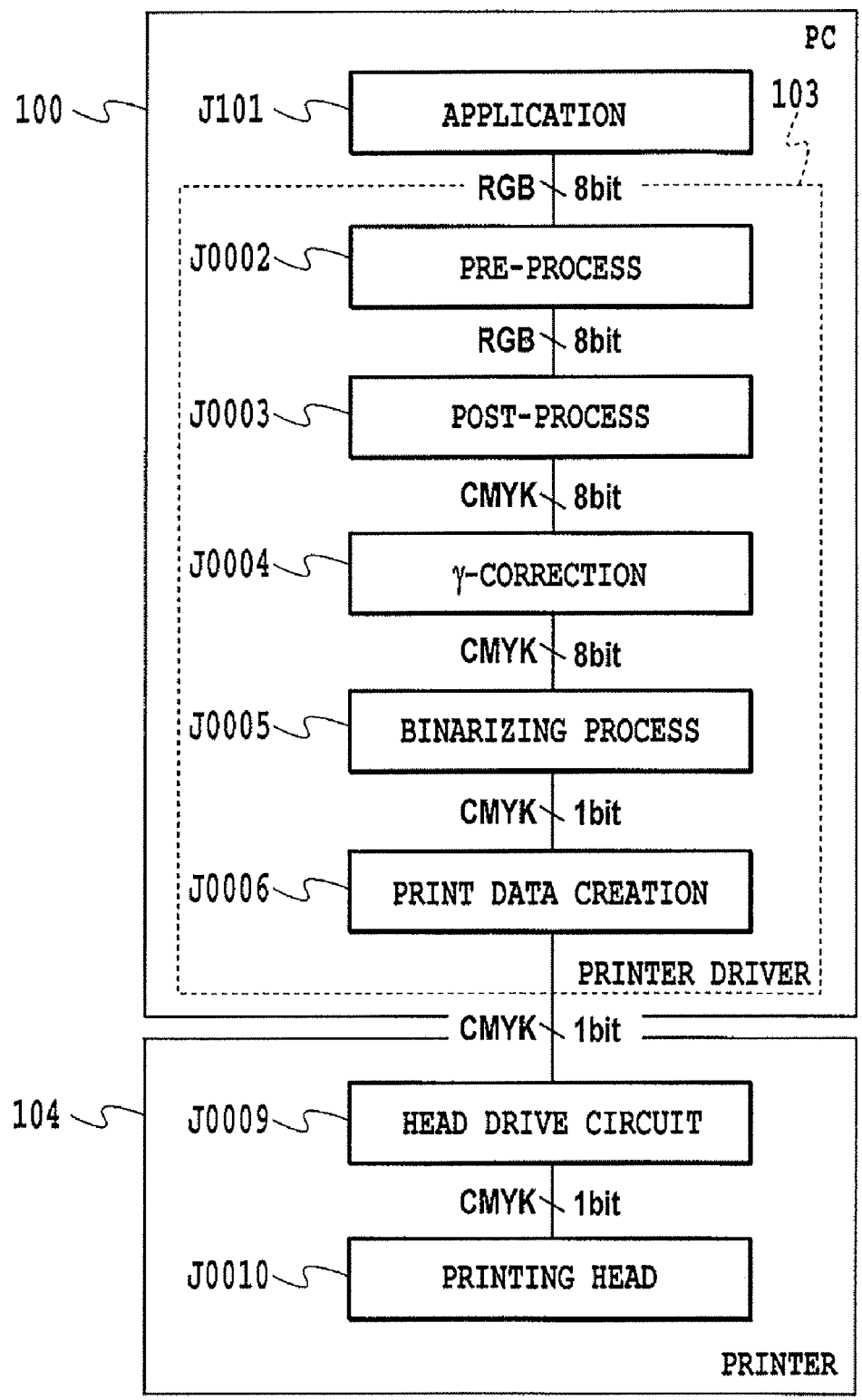
FIG. 2 is a block diagram explaining a flow of image data conversion process in an ink jet printing system according to one embodiment of the present invention.

FIG. 2 is a block diagram illustrating main data processing that is executed in the PC 100 and printer 104 when the printer 104 executes printing in the configuration shown in FIG. 1. The ink jet printer 104 according to the present embodiment executes printing using four ink colors, cyan, magenta, yellow, and black as described above. To achieve this, the ink jet printer 104 comprises a print head J0010 that ejects these four inks.

The user can create image data to be printed by the printer 104, via the application 101. Then, for printing, the image data created through the application 101 is delivered to the printer driver 103.

The printer driver 103 executes its processing including a pre-process J0002, a post-process J003, a γ correction J0004, a binarizing process J0005, and a print data creation J0006. The pre-process J0002 executes a gamut conversion that converts the gamut of a display device that displays a screen provided by an application into the gamut of the printer 104. Specifically, image data R, G, and B in which R, G, and B are each expressed by 8 bits is converted into 8-bit data R, G, and B within the gamut of the printer via a three-dimensional LUT. The post-process J0003 then separates colors reproducing the converted gamut into ink colors. Specifically, the post-process J0003 involves determining 8-bit data C, M, Y, and K corresponding to a combination of inks that are used to reproduce colors expressed by the 8-bit data obtained by the pre-process J0002. The γ correction J0004 is executed for each of the data C, M, Y, and K obtained via the color separation. Specifically, the γ correction executes a conversion such that the 8-bit data C, M, Y, and K obtained by color separation are linearly associated with graduation sequence characteristics of the printer.

Finally, the print data creating process J0006 adds print control data or the like to binary image data containing the binarized 1-bit data C, M, Y, and K to create print data. Here, the binary image data contains dot print data indicating printing of dots and dot non-printing data indicating non-printing of dots. The print control data is composed of "print medium information", "print grade information", and "other control information" on a sheet feeding method and the like. Print data thus generated is supplied to the printer 104.

Next, the binarizing process J0005 executes a quantizing process of converting the γ corrected 8-bit data C, M, Y, and K into 1-bit data of C, M, Y, and K. In this process, binarization is executed using dither patterns described later in relation to embodiments of the present invention. The dither pattern data to be used in this process is in advance stored in a predetermined memory. It should be noted that in the case where no dither pattern data is in advance stored in the predetermined memory and the PC 100 serves as a data processing apparatus for generating dither patterns, the dither pattern generating process described later in relation to each of the embodiments of the present invention is executed. The resultant dither pattern data is stored in the predetermined memory of the PC 100.

Finally, the print data creating process J0006 adds print control data or the like to binary image data containing the binarized 1-bit data C, M, Y, and K to create print data. Here, the binary image data contains dot print data indicating printing of dots and dot non-printing data indicating non-printing of dots. The print control data is composed of "print medium information", "print grade information", and "other control information" on a sheet feeding method and the like. Print data thus generated is supplied to the printer 104.

Figure 3:
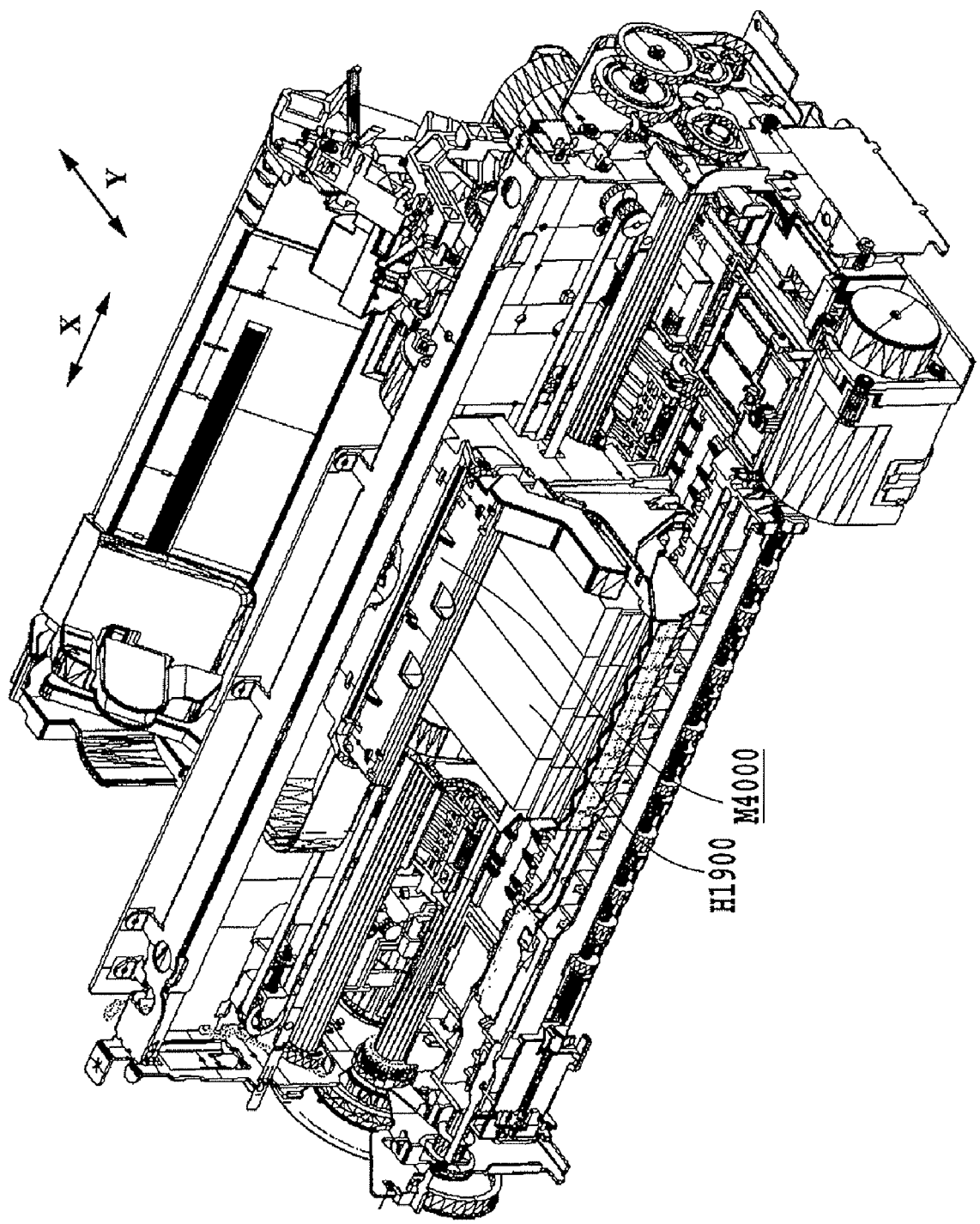
FIG. 3 is a perspective view showing an ink jet printing device applicable to the embodiments of the present invention.

FIG. 3 is a perspective view showing the ink jet printer 104. A carriage M4000 moves in an X direction (main scanning direction) in the figure with mounting the print heads and ink tanks H1900, which supply a cyan (C), magenta (M), yellow, and black (K) inks to the print heads. While the moving of the carriage, the ink is ejected through each of the nozzles in the print heads at predetermined timings, based on the binary divided image data.

Several embodiments of a generating method for dither patterns used in the binarization process J0005 in the above-mentioned printing system or generated in the above-mentioned printing system and a dither pattern according to the method are described below.

EMBODIMENT 1

(1) Summary of the Embodiment

Dots based on data binarized by means of the dither pattern according to the first embodiment of the present invention are appropriately dispersed in which low-frequency components of the dot pattern have less amount, particularly when planes for respective colors are superposed each other. In addition, the example of the above-mentioned embodiment with reference to FIG. 2 relates to a configuration in which the binarization process using dither pattern is executed in the host computer, but a printing apparatus, for example a printer, may execute the binarization depending on a processing load thereon.

In the binarization process according to this embodiment, the binary data (dots) for four planes corresponding to the colors C, M, Y, and K are generated based on four dither patterns according to this embodiment. For ease of simplification, however, the dither patterns to be described below are used for generating binary data for three planes C, M, and Y excluding K.

According to the embodiment, for generating dither patterns corresponding to these three planes, the repulsive force potentials are basically used. This allows the data for the three planes obtained using their respective dither patterns to be generated in such a way that the dot distribution when two or three planes are superposed is appropriately dispersed with a less amount of low-frequency components.

(2) Method for Generating Dither Patterns

Prior to the description of the concrete generating method for a dither pattern according to the embodiment, a manner of application of a repulsive force potential to this generating method for the dither pattern is described below.

With the method for generating the dither pattern according to the embodiment, at the beginning, initial dot patterns are generated for each of a plurality of planes corresponding to the respective dither patterns. In this generation of the dot patterns, a repulsive force potential is used to cause the dots to be arranged at high dispersiveness within the same plane or between the different planes. Then, assuming that these dot patterns are initial patterns, the dots are sequentially thinned out starting at the initial patterns and the thresholds (threshold value) corresponding to the remaining dot patterns after thinning out are arranged at the positions of the dot patterns to generate the dither patterns. The dot patterns are thinned out so that the remaining dot patterns may be arranged with low repulsive force potential energy, improving the dispersiveness of dots after thinning out.

A threshold generating algorithm to be mentioned below defines the current dots and the repulsive force potential thereof in determining each of the thresholds to design so that the dispersiveness is increased. Accordingly, assuming that the dots have been dispersed in relation to the threshold distribution, the above-mentioned algorithm is described below.

Figure 4:
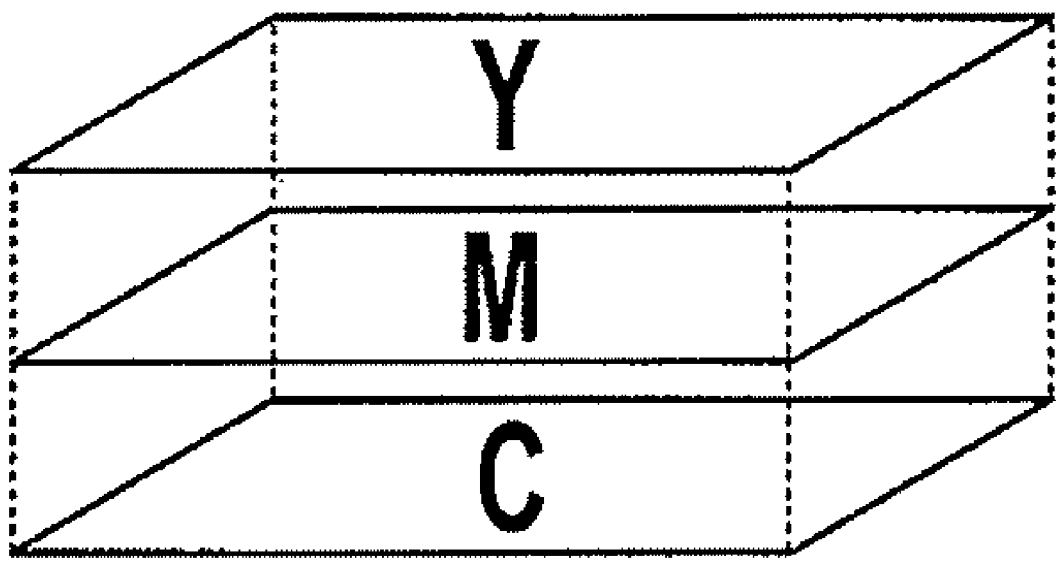
FIG. 4 is a diagram explaining a method for generating dither patterns according to a first embodiment of the present invention.

FIG. 4 is a diagram showing schematically dot pattern generation according to the embodiment.

In the dot pattern generating process, the dot patterns C, M, and Y corresponding to the C, M, and Y color ink are generated. In this dot pattern generating process, the dots are arranged in each of the dot patterns C, M, and Y as described below.

Figure 5:
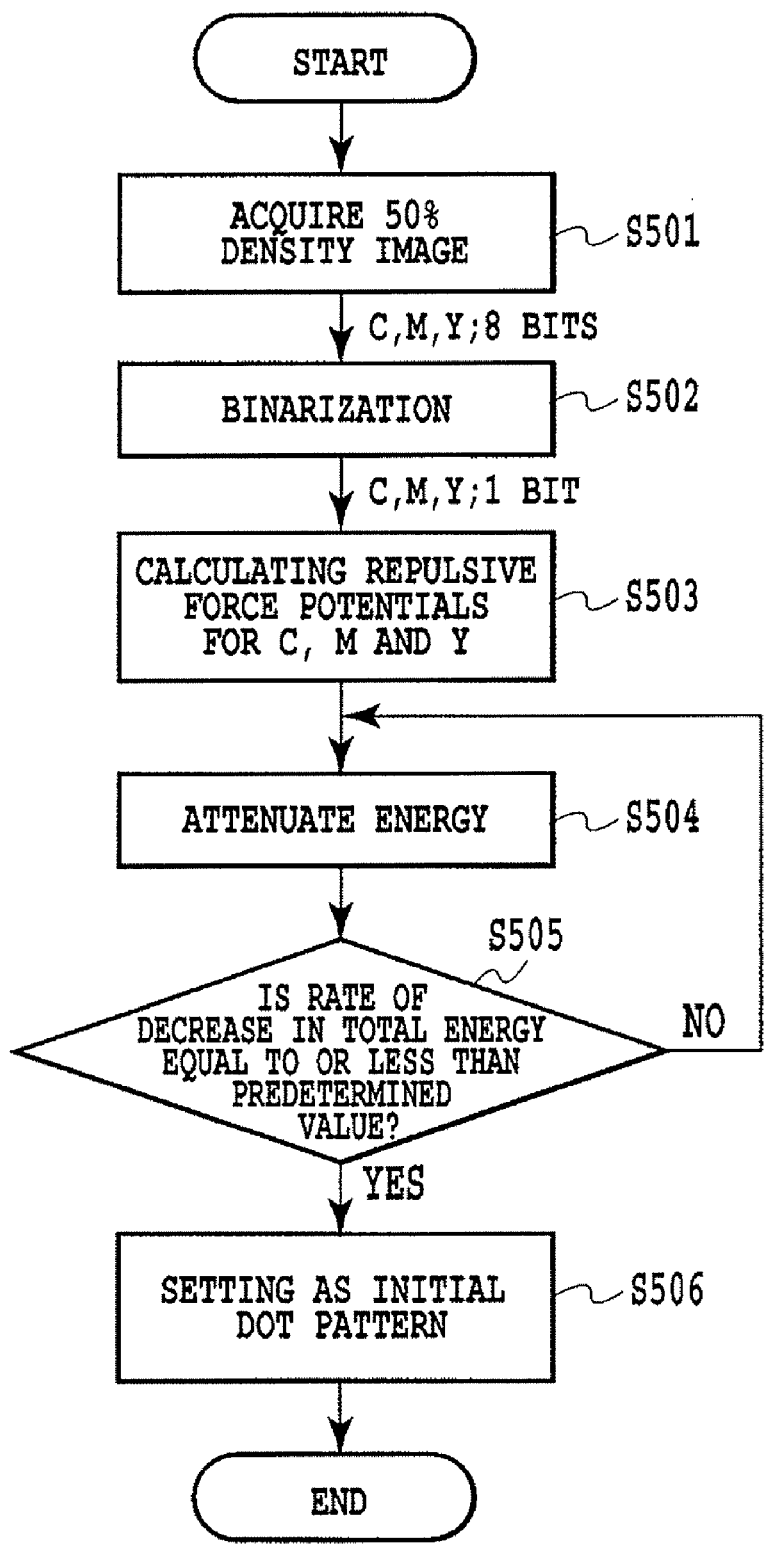
FIG. 5 is a flow chart showing a procedure in a method for generating dither patterns according to the first embodiment of the present invention.

FIG. 5 is a flow chart showing a process for determining the dot arrangement in the dot pattern by an arrangement moving method according to the embodiment.

First, in step S501, C, M and Y images each of 50% density are acquired which correspond to the plane size of the dot patterns C, M, and Y. Then in step S502, each image is binarized by a binarizing technique such as an error diffusion method. Thus, for each of the planes of dot patterns C, M, and Y, an initial arrangement is obtained in which dots with 1-bit data of "1" are disposed on 50% of the dot pattern pixels. The binarizing technique is thus used to obtain an initial arrangement of dots because a somewhat dispersive arrangement is initially obtained depending on the binarizing method used. Further, the binarizing technique makes it possible to reduce the time for calculation or convergence required to subsequently finally determine the arrangement. In other words, the method for obtaining the initial arrangement is not essential on applying the present invention. For example, a plane of dot pattern may have an initial arrangement in which dots with 1-bit data of 1 are randomly arranged. Further, for example, such initial arrangements may be obtained that 50% of the C image is assigned to the first plane, the image obtained by turning the image clockwise at an angle of 90° to the second M plane, and the image obtained by turning the image clockwise at an angle of 180° to the third Y plane.

Then, in step S503, a repulsive force potential is calculated for all the dots in each of the planes of dot patterns C, M, and Y obtained as described above. Specifically, (i) Repulsive force is applied to the dots of the same plane depending on the distance between these dots.
(ii) Also, repulsive force is applied to the dots of different planes.
(iii) Different repulsive force is applied for the same plane and the different planes.
(iv) Dots of different planes are allowed to overlap one another, and repulsive force is applied to overlapping dots (two, three, or more dots) according to combinations of the overlapping dots.

Figure 6:
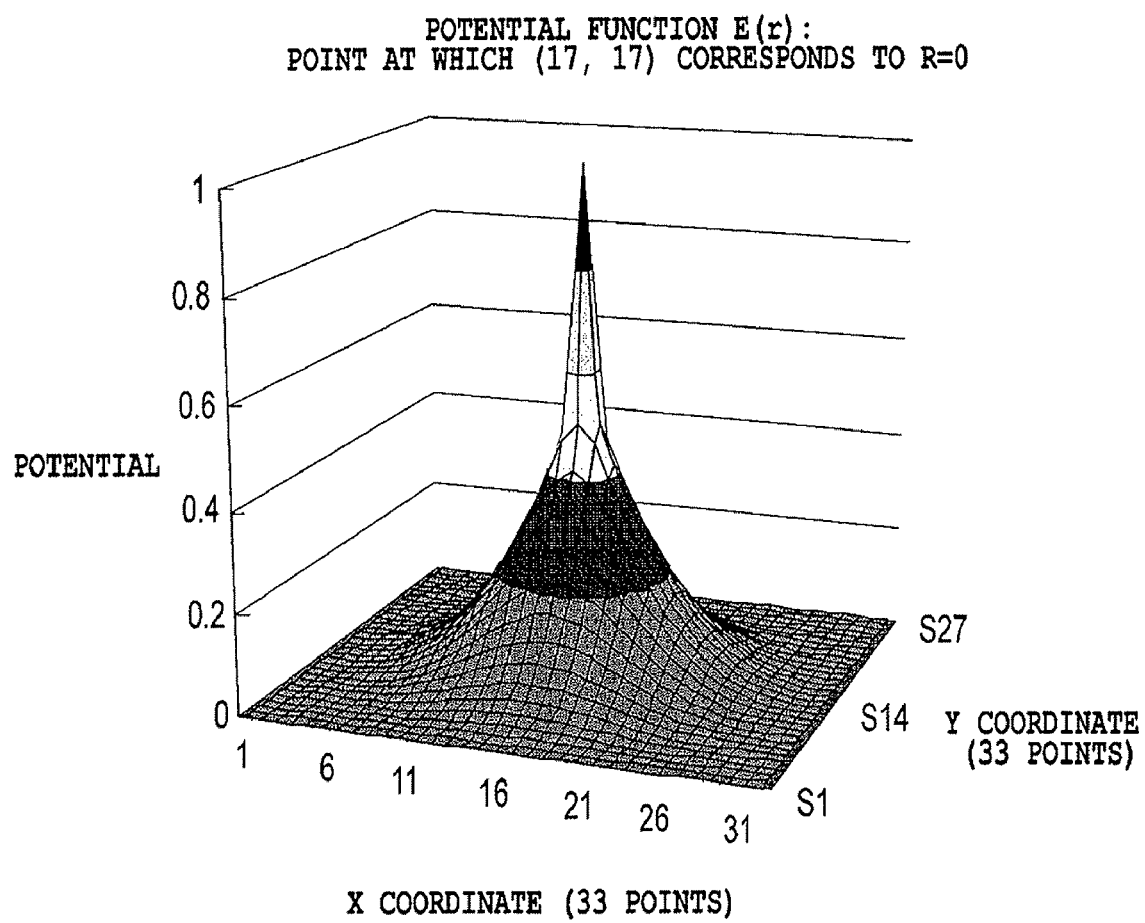
FIG. 6 is a view showing, in the form of a frame format, a function of a basic repulsive force potential E(r) according to the embodiments of the present invention.

FIG. 6 is a diagram schematically showing a function for a basic repulsive force potential E(r) according to the present embodiment.

As shown in FIG. 6, for the repulsive force function that is defined in the present embodiment, the coverage of the repulsive force is up to r=16 (pixels; dot pattern pixels on which dots are arranged). The potential that attenuates depending on the distance basically brings a high energy state, that is, an unstable state when dots are arranged close to one another. Thus, the convergence calculation makes it possible to avoid selection of a dense arrangement as much as possible.

The shape of the repulsive force is more desirably determined by the ratio of the dots to all the dot pattern pixels.

Further, in the case that plural color inks are used for printing, it may occur that the number of positions where ink dots are actually arranged exceed that of positions where ink dots can be arranged (for a resolution of 1200 dpi, 1200×1200 possible positions in a 1-inch square), and then the actual arranged ink dots are made overlapped each other. Accordingly, in calculating the repulsive force potential of each dot, considerations need to be given for possible overlapping of dots each other. Thus, the function is defined so as to have a finite repulsive force potential at r=0. This enables dispersion with possible overlapping of dots taken into account.

The present embodiment executes calculations such that a repulsive force potential αE(r) is applied to the dots on the same plane, a repulsive force potential βE(r) is applied to the dots on different planes, and a repulsive force potential γs(n)E(r) is applied to overlapping dots. More specifically, a repulsive force potential resulting from the presence of a certain dot is what is obtained by adding following potentials to the repulsive force potential: the repulsive force potentials of dots on the same plane, dots on different planes, and an overlapping dots on different planes, respectively within the distance r from the certain dot.

Dot patterns have a finite size (in the present embodiment, 256 pixels×256 pixels), therefore a periodic boundary condition is used which allows the same pattern of 256 pixels×256 pixels to be seemingly repeated. Accordingly, the left end of a dot pattern is adjacent to the right end of that dot pattern. The upper end of a dot pattern is adjacent to the lower end of that dot pattern.

For the above repulsive force potentials, coefficients α, β, and γ are weighting coefficients and in the present embodiment, α=3, β=1, and γ=3. The values α, β and γ affect the dispersiveness of dots. The values α, β and γ can be actually determined by, for example, experimental optimization based on print images printed using the dot patterns.

The coefficient s(n) is used for multiplying in addition to γ in order to disperse overlapping dots. The coefficient s(n) has a value corresponding to the number of overlaps so as to increase the degree of dispersion of the dots consistently with the number of overlaps. The present inventor experiments show that an appropriate dispersion can be achieved by using s(n) determined by either of the two equations:

$$s(n) = \sum_{i=1}^{n} nCi \text{ or } s(n) = \sum_{i=1}^{n-1} nCi \quad \text{[Equation 1]}$$

That is, when the n denotes the number of overlaps, the sum of numbers of combinations is denoted by s(n). Specifically, for an object dot for which repulsive force is to be calculated, overlapping dots (which are located at the same position as that of the object dot on the same plane or different planes) and overlapping dots located at the distance r from the object dot are searched. In this case, n denotes the number of overlaps common to overlapping of the object dot and the dot on the same plane and the different planes, which overlap the object dot at the same position, and overlapping of the dots which are located at the distance r from the object dot, on respective planes, and overlap each other in the same manner. Then, for these two pixels, repulsive forces resulting from the overlapping dots are considered.

In the case of considering an example in which for two pixels, dots are present commonly on a first, second, and third planes, n is defined as 3. Then, repulsive force attributed to the overlapping of the three dots is allowed to act on these pixels. Here, when the repulsive force resulting from the overlapping of the three dots is considered, the repulsive force of the overlapping of every two dots and the repulsive force of each dot are considered to act in a multiplexing manner together with the repulsive force of the overlapping of the three dots. In other words, with the third plane not taken into account, the overlapping may be considered to occur between two dots on the first and second planes. With the second plane not taken into account, the overlapping may be considered to be the one between two dots on the first and third planes. With the first plane not taken into account, the overlapping may be considered to occur between two dots on the second and third planes. To calculate the multiplexing effect of overlapping of the dots, the repulsive force resulting from the combination of overlaps is defined and s(n) such as the one described above is used. The experiments show that this makes it possible to provide a highly dispersive dot arrangement.

Referring back to FIG. 5, in step S503, the total energy is determined which is equal to the sum of the repulsive force potentials of all the dots. Then, processing is executed to reduce the total energy.

This processing involves sequentially shifting each of the dots to one of the pixels located at a distance r of at most 4, at which pixel the repulsive force potential of the shifted dot most decreases. This processing is repeated (step S504) to reduce the total energy that is equal to the sum of the repulsive force potentials of all the dots.

In step S505, the rate of a decrease in total energy obtained in step S504 is calculated. If the rate is determined to be equal to or less than a predetermined value, the energy attenuating process is ended. It should be noted that the predetermined value can be determined, for example, on the basis of the results of actual printing and corresponds to a decrease rate at which an image with appropriately reduced low frequency components can be printed.

Finally, in the step S505, the planes, for which a rate of decrease in the total energy is equal to or less than the predetermined value as mentioned above, are defined as initial dot patterns C, M, and Y in a process mentioned later in relation to FIG. 8.

In step S505, the present embodiment determines whether the rate of a decrease in total energy is equal to or less than the predetermined value. Then if the rate of a decrease in total energy is equal to or less than the predetermined value, the process shifts to step S506. However, the present embodiment is not limited to this example. For example, the present embodiment may determine in step S505 whether or not the total energy is equal to or less than the predetermined value, and if so, shift to step S506.

FIGS. 7A to 7D are diagrams schematically showing the repulsive force potential calculation and total energy attenuating process, described above. More specifically, these figures include perspective views showing the three planes C, Y, and Y according to the present embodiment and plan views specifically showing movement of the dots. In the figures, the smallest squares show dot pattern pixels. Pixels overlapping each other among three overlapping planes correspond to the same pixel position among the planes.

Figure 7A:
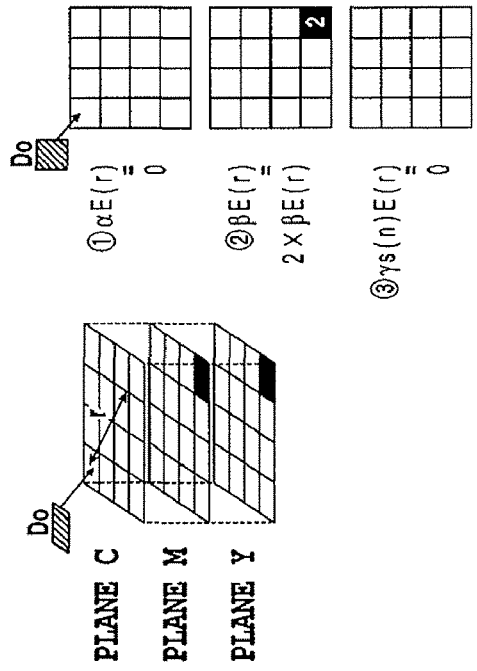
FIG. 7A is a view explaining, in the form of a frame format, application of the repulsive force potential and attenuation process of total energy according to one embodiment of the present invention.

FIG. 7A illustrates that when dots are present on the same plane, the repulsive force of these dots is added to (increases) the repulsive force potential. In the example shown in the figure, one dot is present on the same plane C on which an object dot Do is present at the distance r from that pixel. In this case, $\alpha=3$ is applied, and a potential $1 \times \alpha E(r)$ is added as the potential of the object dot Do.

Figure 7B:
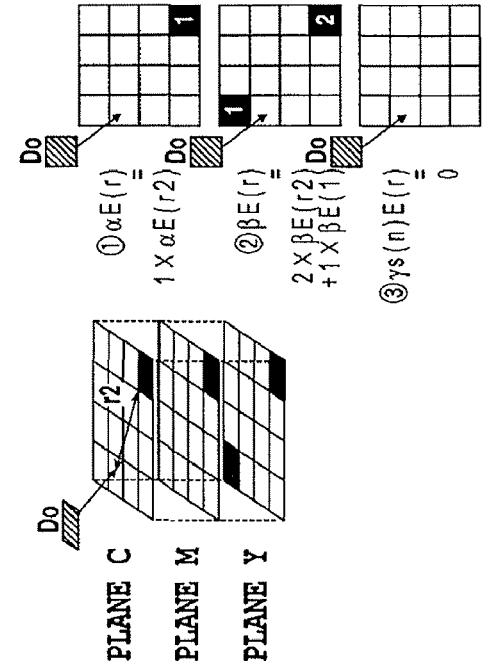
FIG. 7B is a view explaining, in the form of a frame format, application of the repulsive force potential and attenuation of total energy according to one embodiment of the present invention.

FIG. 7B is a diagram illustrating that dots are present on planes (M and Y) different from that on which the object dot Do is present and that a repulsive force potential is added on the basis of the relationship between the object dot and these two dots. The relationship between the object dot and these two dots is that between different planes. Then, $\beta=1$ is applied and a potential $2 \times \beta E(r)$ corresponding to the two dots is added.

Figure 7C:
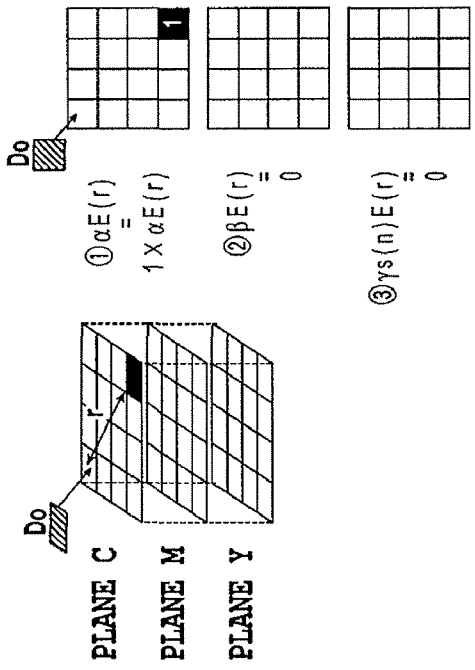
FIG. 7C is a view explaining, in the form of a frame format, application of the repulsive force potential and attenuation process of total energy according to one embodiment of the present invention.

FIG. 7C is a diagram illustrating that dots are present on the same plane on which the object dots is present and on planes different from that on which the object dot is present as is the case with the above two figures, and in addition, a dot is present on the same pixel of a different plane and then that dot and the object dot overlap each another, and illustrating the repulsive force potential based on the relationship among these dots. Not only the conditions shown in FIGS. 7A and 7B are met but a dot is present at the same pixel on the plane Y, which is different from the plane C with the object dot Do present. Thus, the following potentials are added: the repulsive force potential $1 \times \alpha E(r)$ of one dot on the same plane, the repulsive force potential $1 \times \beta E(0)$ of one dot on the different plane at the same pixel, the repulsive force potential $2 \times \beta E(r)$ of two dots on the different planes, and the repulsive force potential $\gamma s(2) \times E(r)$ of overlapping to which $\gamma=3$ is applied at a overlap number n=2. As s result, in the dot arrangement shown in FIG. 7C, the sum of the repulsive force potentials associated with the presence of the object dot Do is $1 \times \beta E(0) + 1 \times \alpha E(r) + 2 \times \beta E(r) + \gamma s(2) \times E(r)$.

Figure 7D:
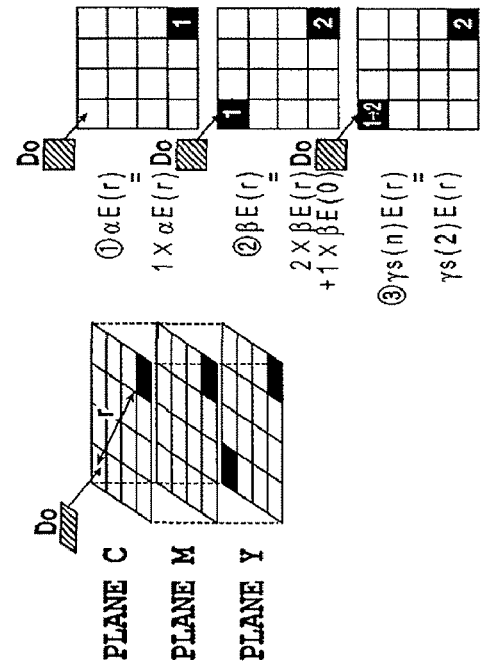
FIG. 7D is a view explaining, in the form of a frame format, application of the repulsive force potential and attenuation process of total energy according to one embodiment of the present invention.

FIG. 7D is a diagram illustrating that in the dot arrangement shown in FIG. 7C, movement of the dot Do changes the sum of repulsive force potentials of this dot. As shown in FIG. 7D, when the dot Do (located on the plane C) shifts to an adjacent pixel on the same plane, the sum of the repulsive force potentials associated with the presence of the dot Do changes into $\beta E(1) + 1 \times \alpha E(r2) + 2 \times \beta E(r2)$ because the distance changes into r2 from r and the number n of overlaps becomes 0. For the dot arrangement shown in FIG. 7C, the sum of the repulsive force potentials $1 \times \beta E(0) + 2 \times \alpha E(r) + 1 \times \beta E(r)\gamma s(2) \times E(r)$ is compared with the sum of the repulsive force potentials resulting from movement of the dot Do in FIG. 7D. This determines a change in the sum of the repulsive force potentials after the movement.

In the above description, the sum of the repulsive force potentials is obtained by determining the sum of energies of the dots between two pixels, or of the dots among three pixels when the dot is moved. However, this is for simplification and the sum of the repulsive force potentials is of course obtained by integrating the repulsive force potentials on the basis of the relationship between the dot of interest and dots including those of other possible pixels other than the above dots.

If, of the dots for each of which the sum of the repulsive force potentials is calculated as shown in FIGS. 7A to 7C, for example the dot Do shows the largest repulsive force potential sum, changes in repulsive force potential after the movement of the pixel Do is determined as described in FIG. 7D and the dot Do is moved to the pixel with most decreasing of repulsive force potential sum. This processing is repeated to enable a reduction in the total energy of the three planes. That is, the dot arrangement of the superposing of the three planes is appropriately dispersed with few low frequency components. By the processes mentioned above, initial dot patterns with high dispersiveness can be achieved, which are base for the generation of the dither patterns.

Figure 8:
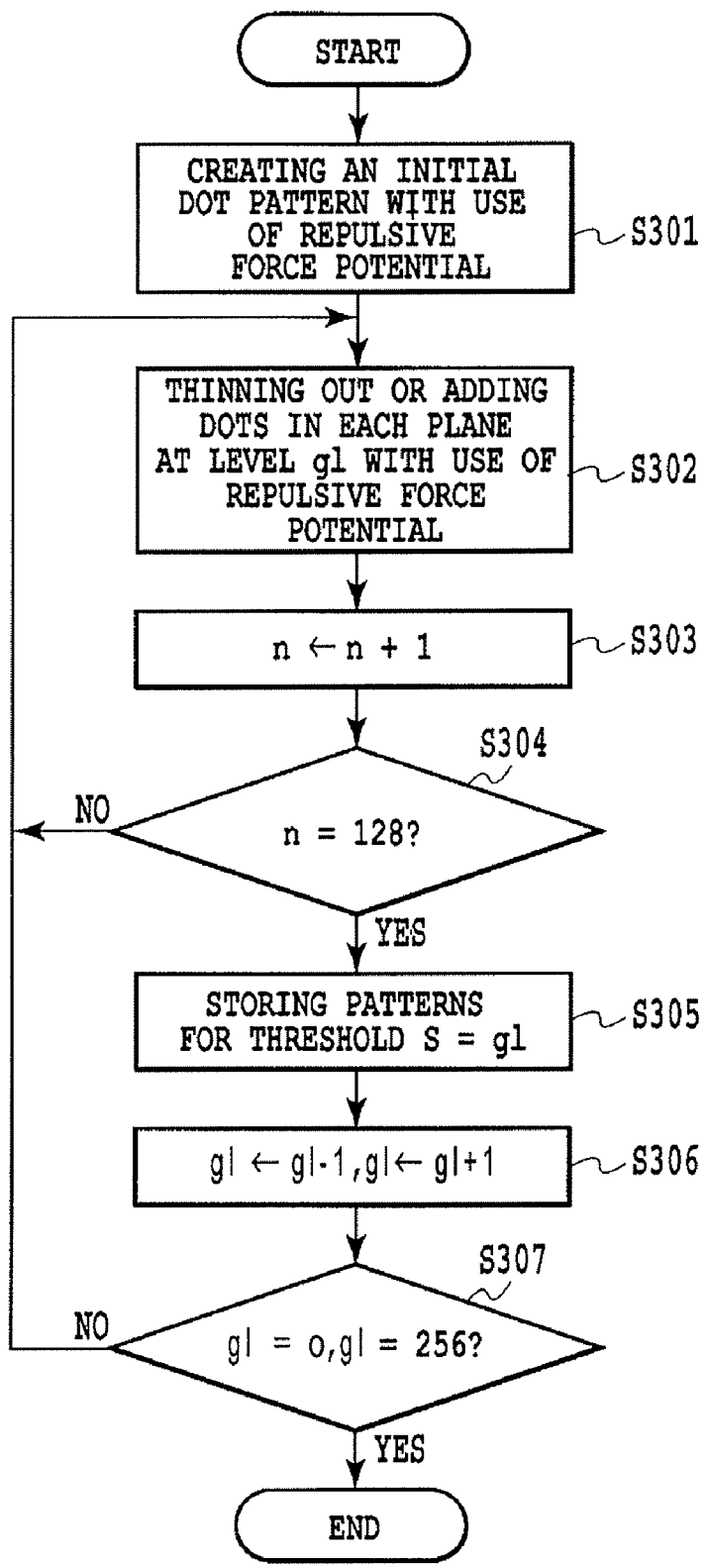
FIG. 8 is a flowchart showing a process of generating dither patterns according to the embodiments of the present invention.

FIG. 8 is a flowchart showing the process of generating dither patterns according to the embodiment.

First, in the step S301, binary patterns with high dispersiveness at a certain gradation are generated as initial dot patterns. In the embodiment, a pattern with 50% of density is generated. Specifically, using the method mentioned with reference to FIG. 5, 128×128 size of initial dot pattern with 50% density is generated. The dot patterns C, M, and Y in the individual planes generated in this manner are stored as initial patterns.

Next, in the step S302, a repulsive force potential is applied to the 128-gradation of initial dot patterns generated in the first step to execute thinning of dots and threshold data is generated for each level of the 128 gradation levels in a lowest level side. Specifically, while the repulsive force potentials for the initial dot patterns are being sequentially calculated, the dots are accordingly thinned. In this process, first of all, the repulsive force potentials are calculated for all the dots in the dot pattern Y in the same manner mentioned with reference to FIG. 5 and the dot with the highest energy is thinned. Next, similarly, the repulsive force potentials are calculated for all the dots in the dot pattern M and the dot with the highest energy is thinned. Furthermore, also similarly, the repulsive force potentials are calculated for all the dots in the dot pattern C and the dot with the highest energy is thinned.

Here, in order to generate a dither pattern for 8-bit data, a dot pattern is determined for each gradation level gl of 128-gradation levels and corresponding to the determined pattern, a dither pattern, namely a threshold distribution are generated. Since the dither pattern has a size of 128×128 in the embodiment, a formula [128×128 pixels÷128 gradation levels=128 pixels/gradation level] is established and 128 dots are thinned for each gradation level in each plane.

That is, after the dot is thinned for each plane (step 302), a parameter n for the number of times is incremented (in the step S303) and it is determined whether or not n has reached 128 (in the step S304). The steps S302 and S303 are repeated until 128 dots are thinned (in the step S304). When the step S304 terminates, the finally obtained dots for the dot patterns in the individual planes are stored as threshold arrangement patterns, in which the dots are replaced with the values (gradation values) at the gradation level gl. It is of course that the threshold pattern at the 127 gl corresponding to the initial dot pattern is in advance generated based on its initial pattern.

By repeating the processes (steps S302 to S304) mentioned above using the dot pattern obtained through the process obtained at the previous gradation level as the initial pattern until the gradation level gl reaches 0 (zero) (steps S302 to S307), the threshold pattern of the gradation values on the low gradation side can be generated.

The threshold patterns on a high gradation side are similarly generated. For the high gradation side, while dots are gradually being added, the repulsive force potentials are accordingly applied to calculate increments of energy. First, assuming that a dot is added to each of blank points (pixels) in the dot pattern C, the increments of energy are calculated for all the blank points. Then, a dot is added to the point, of which the increment of energy is the smallest. This process is executed in the same manner as that of the process shown in FIG. 8. Similarly, dots are added in the dot patterns M and Y. Other processes are identical to those on the low gradation side.

By combining the threshold patterns, which are obtained in this manner in the individual planes at each gradation level, a dither pattern is generated in each of planes C, M, and Y.

It should be noted that a method for arranging dots in the dither pattern is not limited to a method, by which a dot is thinned out or added using 50% density as an initial value as shown in the above example. For example, dots may be arranged so that a dot (threshold) is added in the blank plane using 0% as the initial dot pattern. The dot is added in the same manner as that for obtaining the threshold arrangement on the high gradation side.

(3) Dither Pattern Characteristic Evaluation

Effect of Repulsive Force Potential Weighting Coefficients $\alpha$, $\beta$, and $\gamma s(n)$ on Dither Patterns First, a specific description will be given of the effects of the weighting coefficients $\alpha$, $\beta$, and $\gamma s(n)$ for the repulsive force potential force calculation (discussion will not be given of the distance but only of effects of the coefficients) on dither patterns generated by the dither pattern generating methods according to the present embodiment, described above. In an algorithm for generating thresholds for the dither patterns mentioned above, a dot and its corresponding repulsive force potential were defined in determining the thresholds if applicable to achieve design with higher dispersiveness. Accordingly, it is also assumed that dots are dispersed based on the threshold distribution. As described above, the coefficient $\alpha$ acts on the dispersion of dots on the same plane. The coefficient $\beta$ acts on the dispersion of dots between different planes. The coefficient $\gamma s(n)$ acts on the dispersion of overlaps if dots on different planes are located on the same pixel and overlap each other.

It should be noted that in the present embodiment, the same function (FIG. 6) is used for all the terms as E(r) However, different potential functions may be used for the respective terms. In this case, of course, a difference in dispersion described below essentially corresponds to the difference among $\alpha E(r)$ and $\beta E(r)'$ and $\gamma E(r)''$ that are the product of the function E(r) and each of the corresponding weighting coefficients $\alpha$, $\beta$, and $\gamma(n)$.

If the repulsive force potential is defined only for dots on the same plane and energy is attenuated to determine the dot distribution, that is, if $\alpha=1$ for $\alpha E(r)$ and $\beta=\gamma=0$, the dot arrangement on one plane is such that the dots are appropriately dispersed on each plane. This is due to the effect of $\alpha E(r)$. However, a pattern of overlapping dots (a logical product or a logical sum) extracted from two (plural) superposed planes is biased in terms of the arrangement of dots and has a large amount of low frequency components. This is because some dots on two planes may happen to overlap one another or because a bias may result from the lack of association between two planes.

Next, it is assumed that the same repulsive force potential is applied to all the dots on the three planes, that is, $\alpha=\beta=1$ for $\alpha E(r)$ and $\beta E(r)$ and $\gamma=0$. In this case, the dot distribution on each plane has a certain amount of low frequency components and has biased distribution. On the other hand, the dot distribution (logical sum) on the superposed three color planes is appropriately dispersive. This is because $\alpha$ and $\beta$ have the same value, so that the effect of dispersion of dots on the same plane is the same as that on the other planes, with resultant insufficient dispersion of dots on each plane.

Thus, to vary the repulsive force potential between the same plane and different planes, for example, $\alpha=3$ and $\beta=1$ are set. This makes it possible to relatively reduce the effects of the other planes, improving the dispersion within the same plane. Moreover, the dot dispersion (logical sum pattern) of two superposed planes is appropriately dispersive and has few low-frequency components. Thus, the dispersion of dots is improved both on the same plane and on different planes. That is say, the dispersion both on the same plane and on different planes is improved by making the terms $\alpha E(r)$ and $\beta E(r)$ effective and making the values $\alpha$ and $\beta$ different from each other.

Next, discussion will be given first of the case in which the term $\gamma s(n)E(r)$ is not used when some dots overlap one another. Two planes having dot distributions having few low-frequency components are superposed without making the term $\gamma s(n)E(r)$ effective. Then, overlapping dots (the logical product) are extracted from the resulting dot distribution and have an inappropriate distribution with a large amount of low frequency components.

In contrast, the use of the term $\gamma s(n)E(r)$ first provides each plane with a dot distribution having few low-frequency components. Then, a distribution of overlapping dots (the logical product) extracted from a dot distribution of the superposed planes has an arrangement with few low-frequency components.

Thus, the term $\gamma s(n)E(R)$ is basically effective in appropriately dispersing overlapping dots. Here, as described with reference to FIGS. 7A to 7D, this term is set so that the potential increases consistently with the number of overlaps and thus moves or arranges each dot according to the potential to attenuate the energy, and give an effect that reduces the number of the overlaps while lowering the energy. This means that the above effect is the same as that of $\alpha E(r)$ for reducing the number of adjacent dots on the same plane. Thus, the term $\gamma s(n)E(r)$ is effective not only in dispersing overlapping dots as much as possible but also in reducing the number of overlaps. This effect makes it possible to minimize the number of dots in a mass of adjacent or overlapping dots. As a result, a dot distribution with few low-frequency components can be obtained.

Consequently, the present embodiment uses the values $\alpha=3$, $\beta=1$, and $\gamma=3$ as described above.

For example, $\alpha$, $\beta<<\gamma$ may be set and overlapping dots extracted from plural superposed planes may be noted so that the effect of the term $\gamma s(n)E(r)$ is utilized to obtain an appropriate dispersion in which overlapping dots have very few low frequency components.

Further, in the present embodiment, the repulsive forces among the planes are all $\beta E(r)$. However, the interactions among the planes may be effectively varied taking the magnitudes of the interactions into account. For example, the repulsive force potential between planes of dither patterns used for inks landed at as short a time interval as possible is made higher than the other repulsive force potentials. In other words, the coefficient of $\beta E(r)$ or the shape of $E(r)$ may be effectively varied among the planes. Further, for example, when a reaction system is used for fixation, if ink containing a reaction liquid or such a component is ejected using the print head, it is effective to make the repulsive force potential between a plan dither pattern used for the reaction liquid or the like and a plane dither pattern used for ink that reacts markedly with the reaction liquid or the like, higher than a normal repulsive force potential. A specific example of variation of the repulsive force potential function is variation of the coverage distance r of the repulsive force. For example, r may be 16 at most as described above when image data for processing has a gray scale value of 50% and may increase as the gray scale value increases above or decreases below 50%.

In the present specification, more even dispersion of dots or their overlaps means a "more appropriate dispersion" or a "better dispersion". The "even dispersion" correspond to, in the above example of the repulsive force potential, the minimized total energy, that is, the minimized number of overlaps or adjacencies in a mass of overlapping or adjacent dots. Moreover, in this state, the dots are arranged as evenly as possible. Furthermore, the expression "a decrease in an amount (value) of low frequency components" means that the amount (value) of frequency components in an area (low frequency area) relating to sensitive human visual characteristics decreases depending on the level of the dispersion.

Dither Patterns According to the Embodiment and Conventional Art

Figure 9:
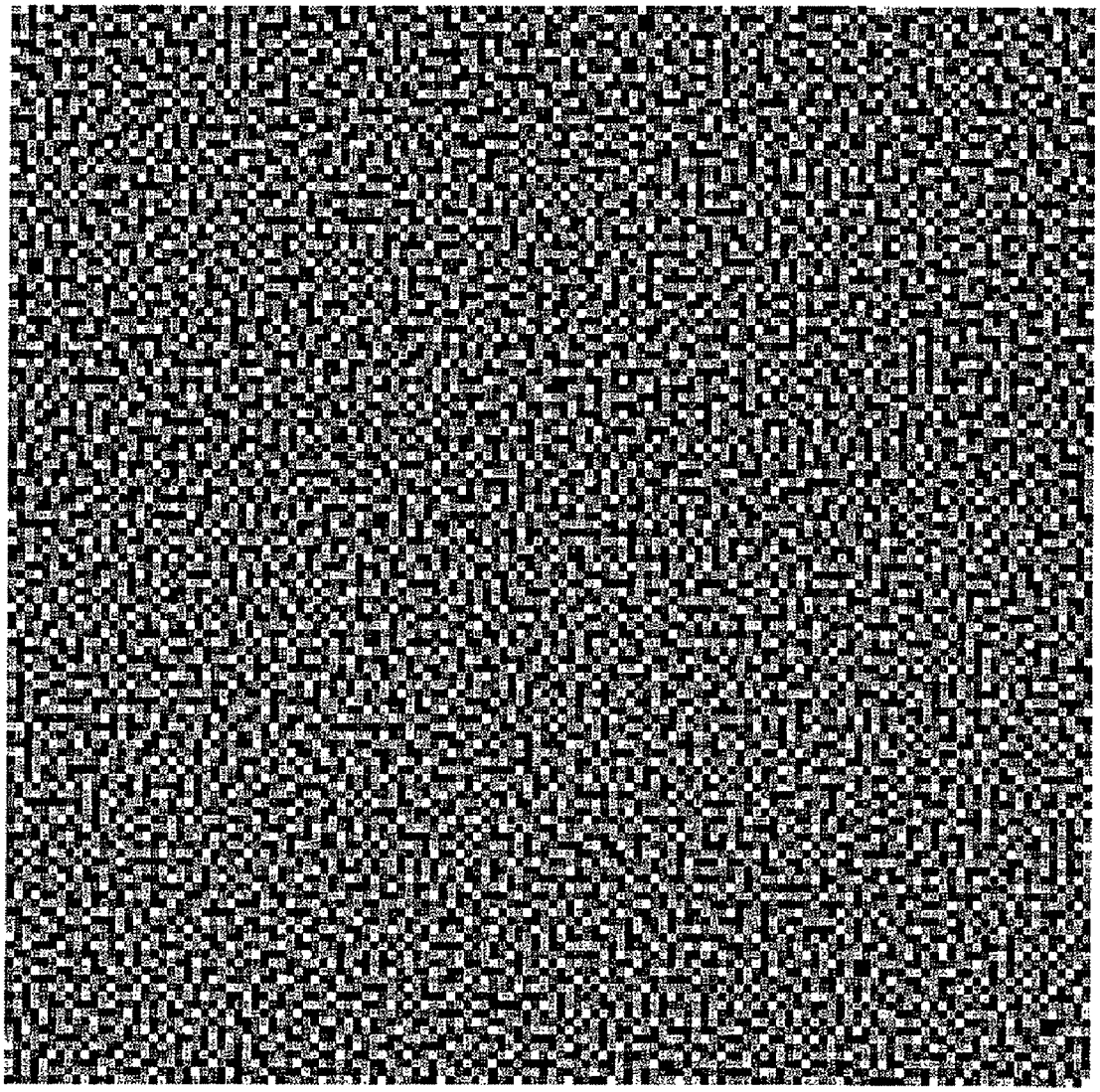
FIG. 9 is a view showing the arrangement of thresholds for the dither pattern according to a first embodiment of the present invention.
Figure 10:
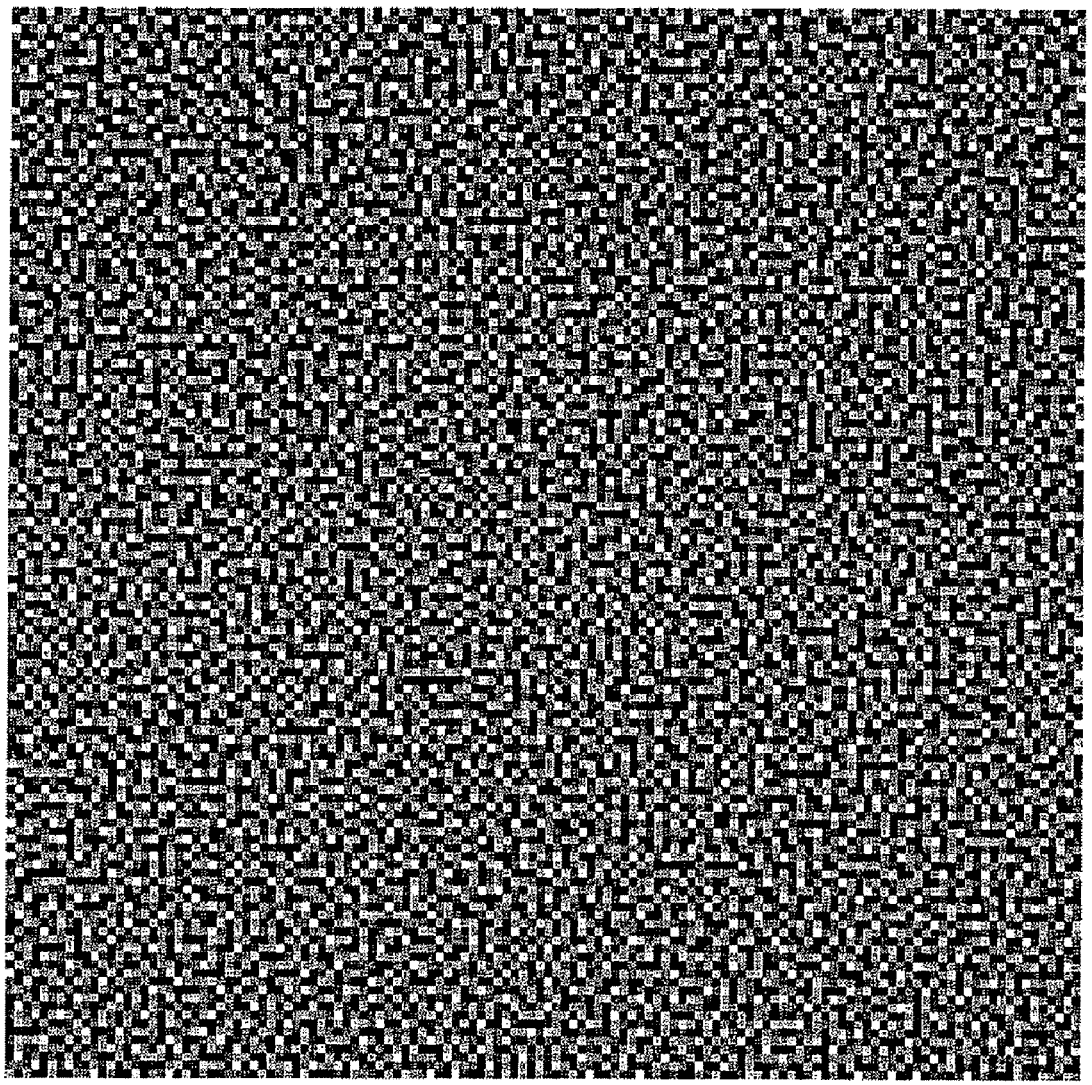
FIG. 10 is a view showing the arrangement of thresholds for the dither pattern according to the first embodiment of the present invention.
Figure 11:
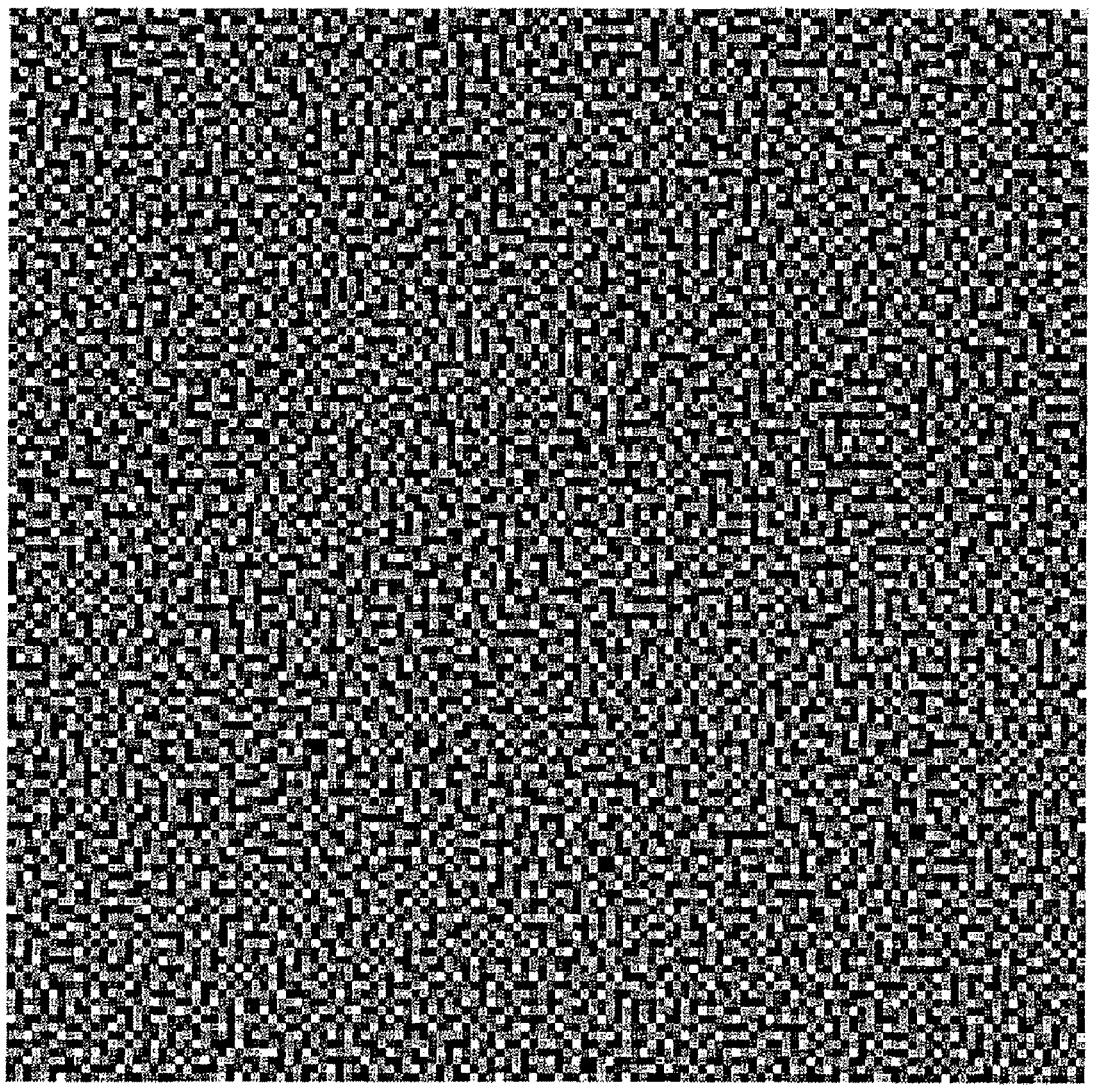
FIG. 11 is a view showing the arrangement of thresholds for the dither pattern according to the first embodiment of the present invention.
Figure 19:
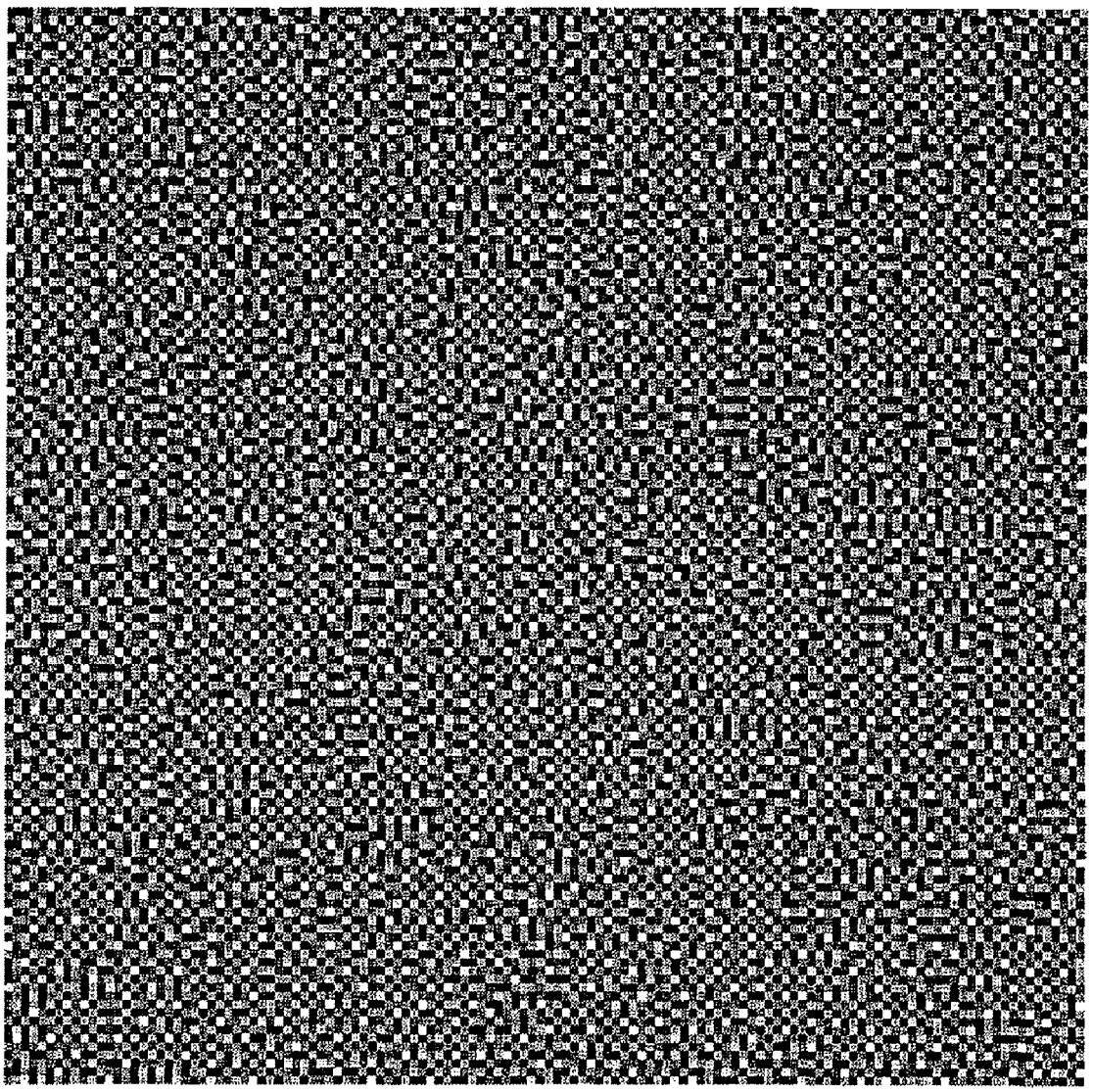
FIG. 19 is a view showing the arrangement of thresholds of a dither pattern according to a conventional art.

FIGS. 9 to 11 are views showing the threshold patterns for the dither patterns C, M, and Y (hereinafter, simply referred to as "layer dither patterns") generated by the method mentioned above according to the present embodiment at the densities corresponding to the values for thresholds. FIG. 19 is a view showing a similar pattern for the dither patterns according to the conventional art disclosed in Patent Documents 1 and 2.

The dither patterns shown in FIGS. 9 to 11 and 19 have an area of 128×128 pixels. In each pattern, a lower density indicates a larger threshold.

As shown in these figures, in the patterns according to the dither pattern of the conventional art in FIG. 19 and the dither patterns of the embodiment in FIGS. 9 to 11, the dots are arranged, in particular, considering the dispersiveness of the dots in the same plane by means of the effect of the factor α. There is brought the impression that with no bias in dispersion for each density indicated by the threshold value, and thus the dither patterns give a smooth feeling.

Figure 12:
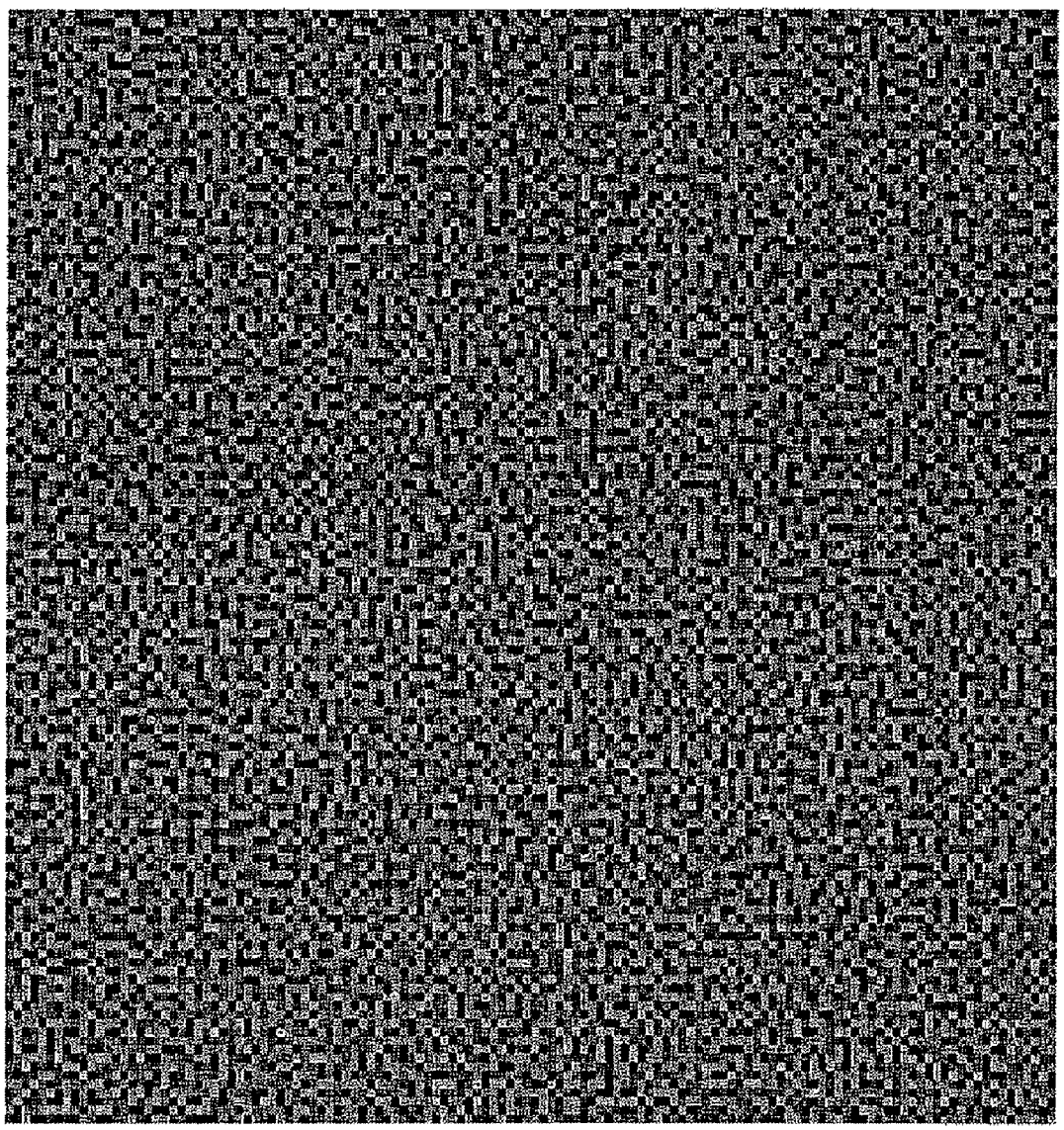
FIG. 12 is a view showing the arrangement of average threshold of two dither patterns according to the first embodiment of the present invention.
Figure 13:
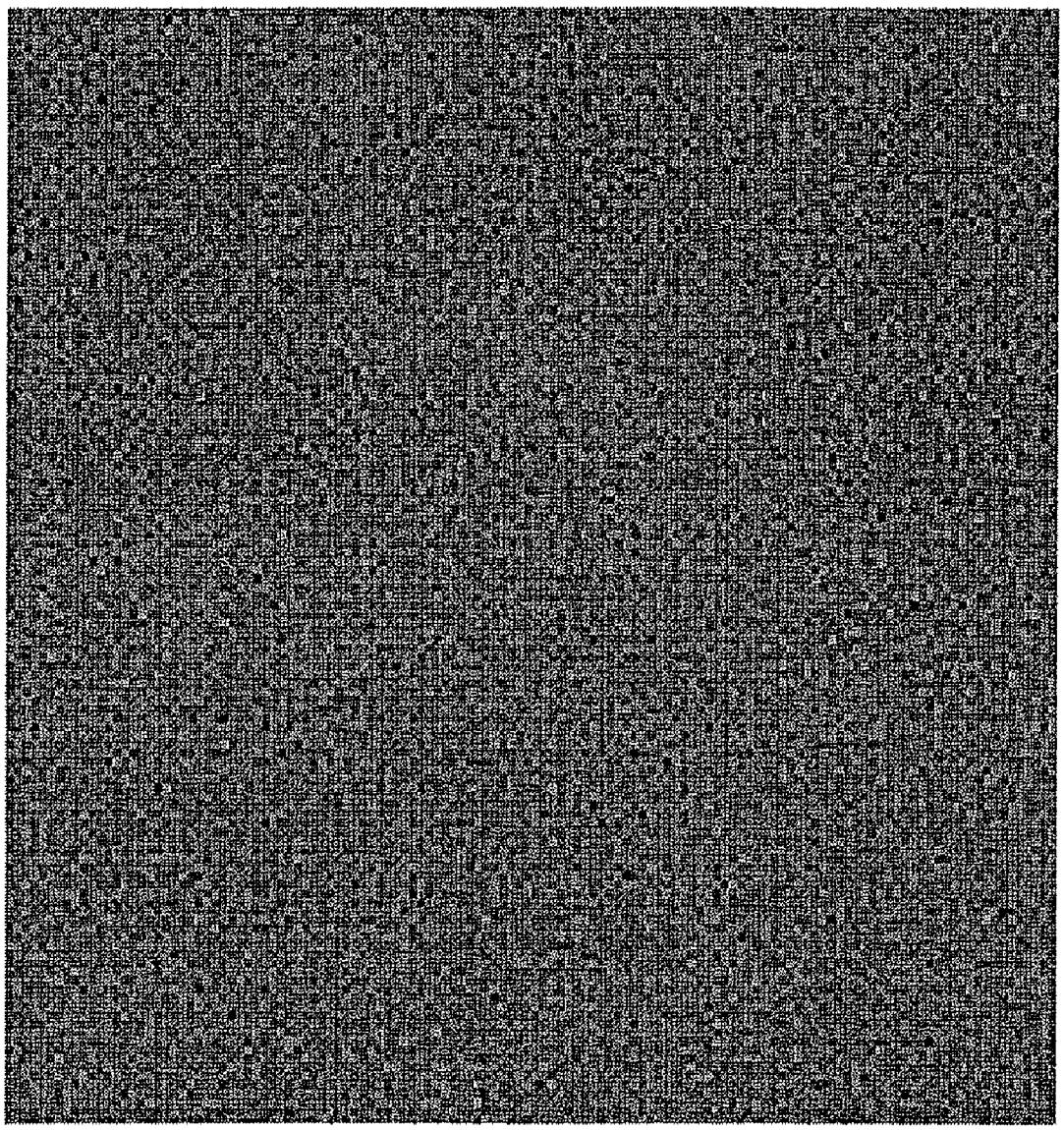
FIG. 13 is a view showing the arrangement of average threshold of three dither patterns according to the first embodiment of the present invention.
Figure 20:
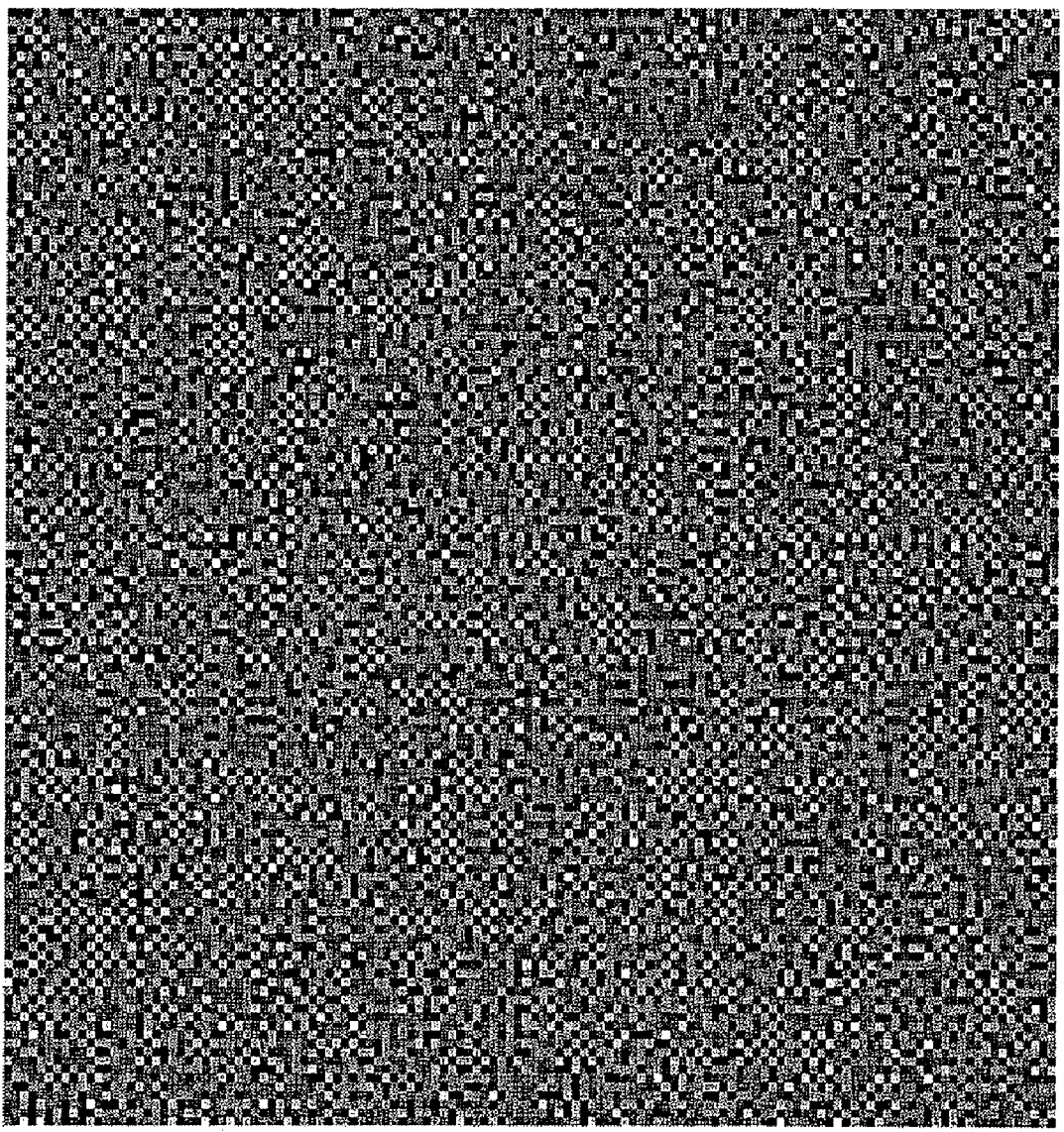
FIG. 20 is a view showing the arrangement of average threshold of two dither patterns according to the conventional art.
Figure 21:
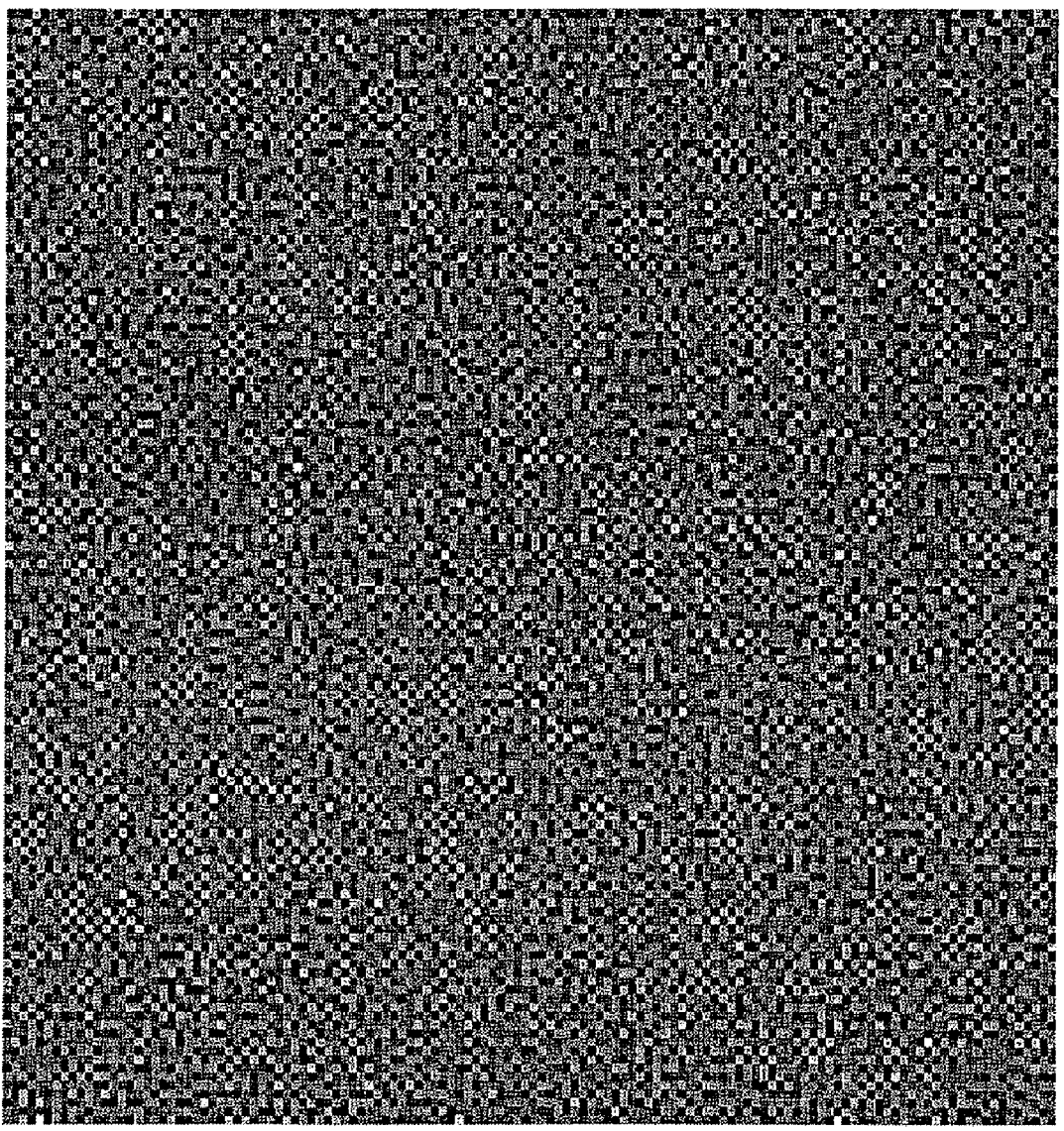
FIG. 21 is a view showing the arrangement of average threshold of three dither patterns according to the conventional art.

FIG. 12 is a view showing the averages of the thresholds for the pixels at the identical positions in the layer dither patterns C and M shown in FIGS. 9 and 10 according to the embodiment in the form of a density pattern corresponding to their threshold values. FIG. 13 is a view showing the averages of the thresholds for the layer dither patterns C, M, and Y according to the embodiment shown in FIGS. 9, 10, and 11 in the form of a density pattern corresponding to their threshold values. FIG. 20 is a view showing the averages of the thresholds for the pixels at the identical positions in the dither pattern C according to the conventional art shown in FIG. 19 and in the dither pattern M, which is obtained by shifting the pattern C, in the form of a density pattern corresponding to their threshold values. FIG. 21 is a view showing the averages of the thresholds for the pixels at the identical positions in the dither pattern C according to the conventional art shown n FIG. 19 and in the dither patterns M, Y obtained by shifting the dither pattern C in the form of a density pattern corresponding to their threshold values. The superposing of the patterns can be easily shifted in these patterns because the dither patterns meet the aforementioned periodic boundary condition.

As shown in FIGS. 12 and 13, the averages of the thresholds for two or three superposed dither patterns according to the embodiment are arranged with better dispersiveness and no rough-surface texture in each case. As mentioned above, this successful arrangement is achieved by taking not only the dispersiveness (the factor $\beta$) of the dots between two planes but also the dispersiveness (the factor $\gamma s(n)$) of overlapped pixel positions into consideration. In contrast, the averages of the thresholds for the dither patterns according to the conventional art shown in FIGS. 20 and 21 are arranged in the patterns with low dispersiveness and rough-surface texture.

Figure 22:
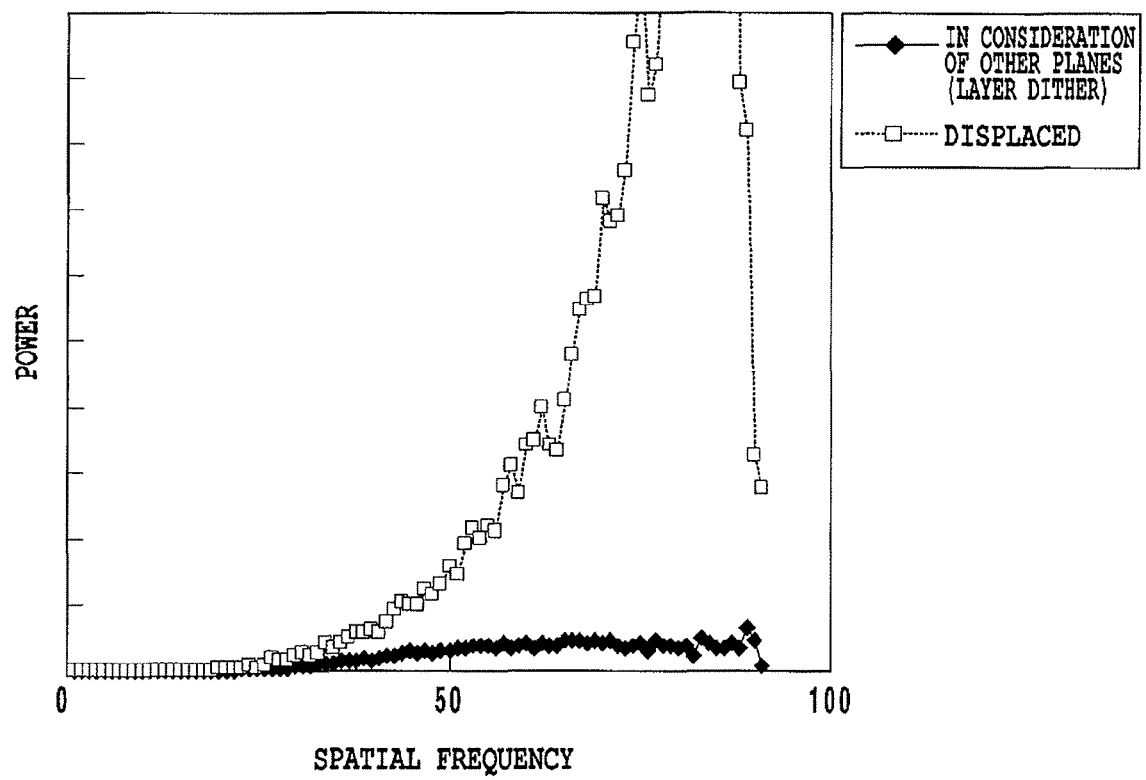
FIG. 22 is a view showing power spectra of average threshold of three dither patterns for each of the dither pattern according to the first embodiment of the present invention and the dither pattern according to the conventional art.

FIG. 22 is a view showing the comparison of power spectra for the arrangement patterns of the respective averages of the thresholds in the respective patterns obtained by superposing the layer dither patterns according to the embodiment and by superposing the dither patterns according to the conventional art. This power spectrum is a radially average power spectrum described in "T. Mitsa and K. J. Parker, "Digital Halftoning using a Blue Noise Mask", Proc. SPIE 1452, pp.47-56(1991)", which allows two-dimensional space frequencies to be handled as one-dimensional ones.

As seen from this figure, the arrangement patterns of the averages of the thresholds according to the conventional art taking no account of dispersion across other planes provide larger power, as well as a larger amount of low frequency components than that according to the embodiment.

Figure 23:
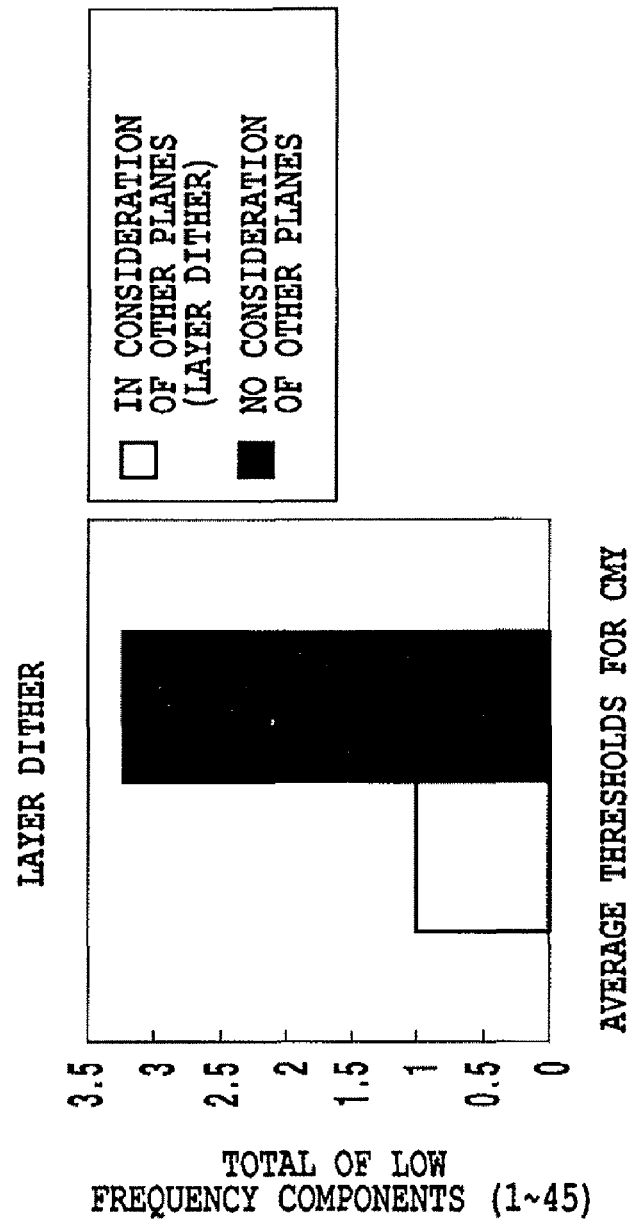
FIG. 23 is a view showing a difference between low-frequency components of average threshold for each of the dither pattern according to the first embodiment of the present invention and the dither pattern according to the conventional art.

FIG. 23 is a view showing the comparison of the magnitudes of the low frequency components between the power spectra for the arrangement pattern of the averages of the thresholds for the layer dither pattern according to the embodiment and for the dither patterns according to the conventional art. As is apparent from this figure, in the case that dither patterns are overlapped, the conventional patterns have a larger amount of low frequency components.

One characteristic of the present invention is that focus is given to "low frequency components" present in the lower frequency side of a half of the entire frequency area in which the power spectrum of the dither pattern is present. When a dither pattern has few low-frequency components, beading attributed to the dispersion of grains is unlikely to occur or to be visually recognized. This prevents a printed image from giving the observer a rough feeling. Further, in particular, the dither pattern is two-dimensionally repeatedly used for an image in which one pattern is printed. Repetition of a given dither pattern causes the repeated pattern to be more likely to perceived by the observer as the amount of low frequency components increases. The pattern significantly affects the occurrence and appearance of beading, resulting in a rough feeling associated with the dither pattern period. It is thus important to focus on the repeated pattern to design the dither pattern such that it shows few low-frequency components. That is, the present invention focuses on the lower frequency area, which may cause a visually rough feeling, to reduce the components of the low frequency area. In other words, the dither pattern according to the present invention is featured in showing a reduced low frequency power.

Moreover, frequency characteristics relating to the sensitivity of the human eyes depend on the distance between print matter and the eyes or the like as discussed in many documents such as a Dooley's document (R.P. Dooley: Prediction Brightness Appearance at Edges Using Linear and Non-Linear Visual Describing Functions, SPES Annual Meeting (1975)). Various experiments show that when viewing print matter, the human eyes readily perceive the components of an area of frequencies lower than about 10 cycles/mm. The present inventor has also experimentally confirmed this. It is thus important to focus on an area (lower frequency area) of frequencies lower than 10 cycles/mm. Actually, the eyes may be moved closer to the print matter. The present inventor thus thinks it important to design the dither pattern focusing on the area of low frequencies lower than about 20 cycles/mm. This range generally coincides with the low frequency area to which focus is given in connection with dither pattern evaluations according to embodiments described later (for example, FIG. 16).

Evaluation Based on Displacement

The dither pattern according to the embodiment of the present invention differs from the conventional dither pattern (dispersed dither pattern only in self plane described in Patent Document 1), which is obtained taking only one plane into account, in a change in dispersiveness between the superposing of different planes of dither patterns at a regular position and their superposing at an irregular position. For the dither pattern according to the embodiment of the present invention, superposing different planes of dither patterns with intentional displacement makes the pattern of threshold value arrangement significantly less dispersive. That is, since the present embodiment also takes the dispersion among the different planes into account, the dispersiveness is markedly degraded if the dither patterns are superposed one another in a manner different from the regular one with the dispersion taken into account. On the other hand, since the dispersed dither pattern only in self plane according to the conventional example does not take the dispersion among the different planes into account, the dispersiveness remains unchanged even if the dither patterns are superposed one another in a manner different from the regular one.

This displacement evaluation is executed as follows. Planes C1, M1, and Y1 generated according to the above generating method are randomly displaced with respect to one another in each color raster direction. In this case, the dither patterns themselves are periodically arranged and can thus be displaced with respect to one another.

Figure 14:
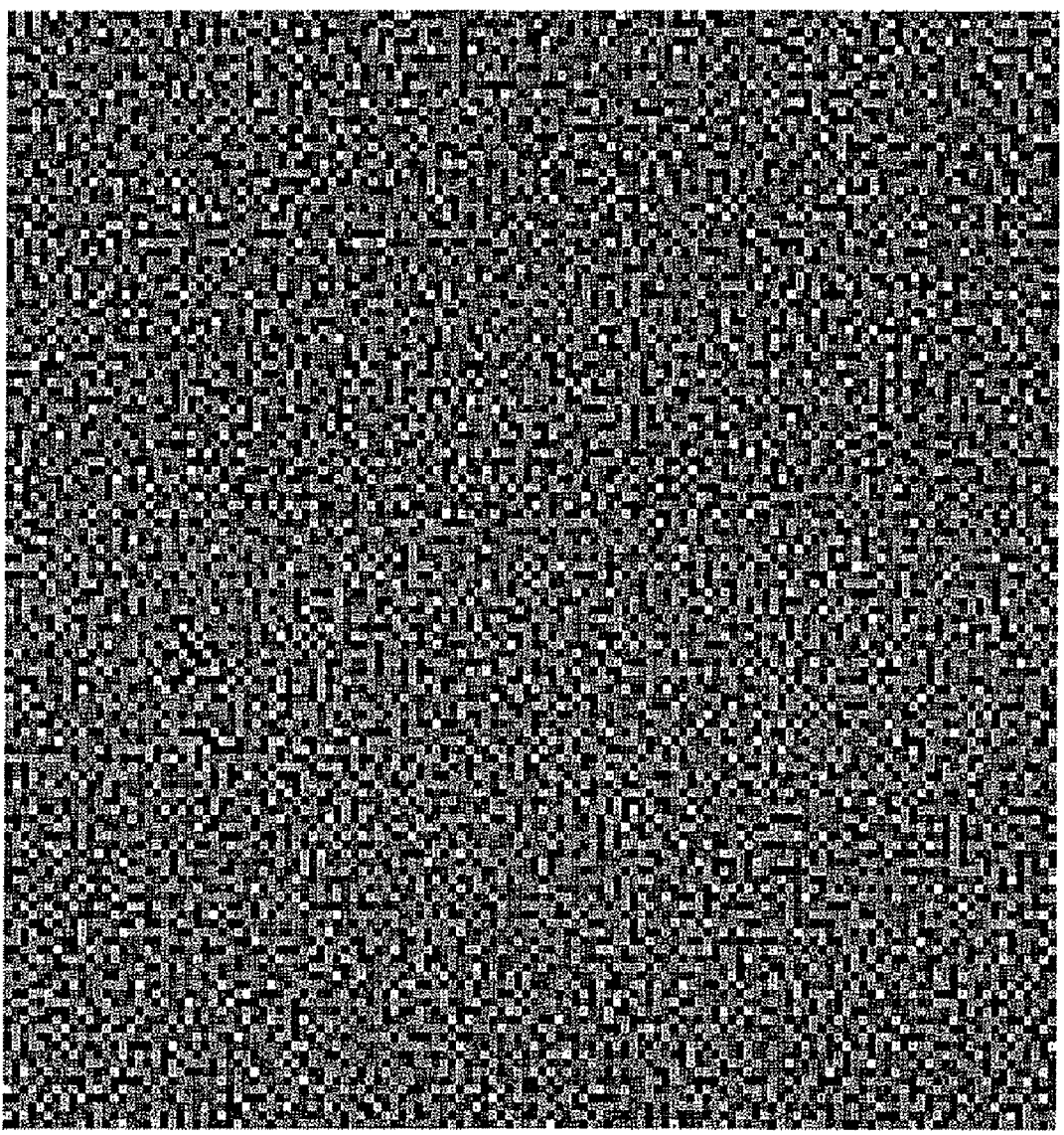
FIG. 14 is a view showing the arrangement of average threshold of two dither patterns when these dither patterns are displaced according to the first embodiment of the present invention.
Figure 15:
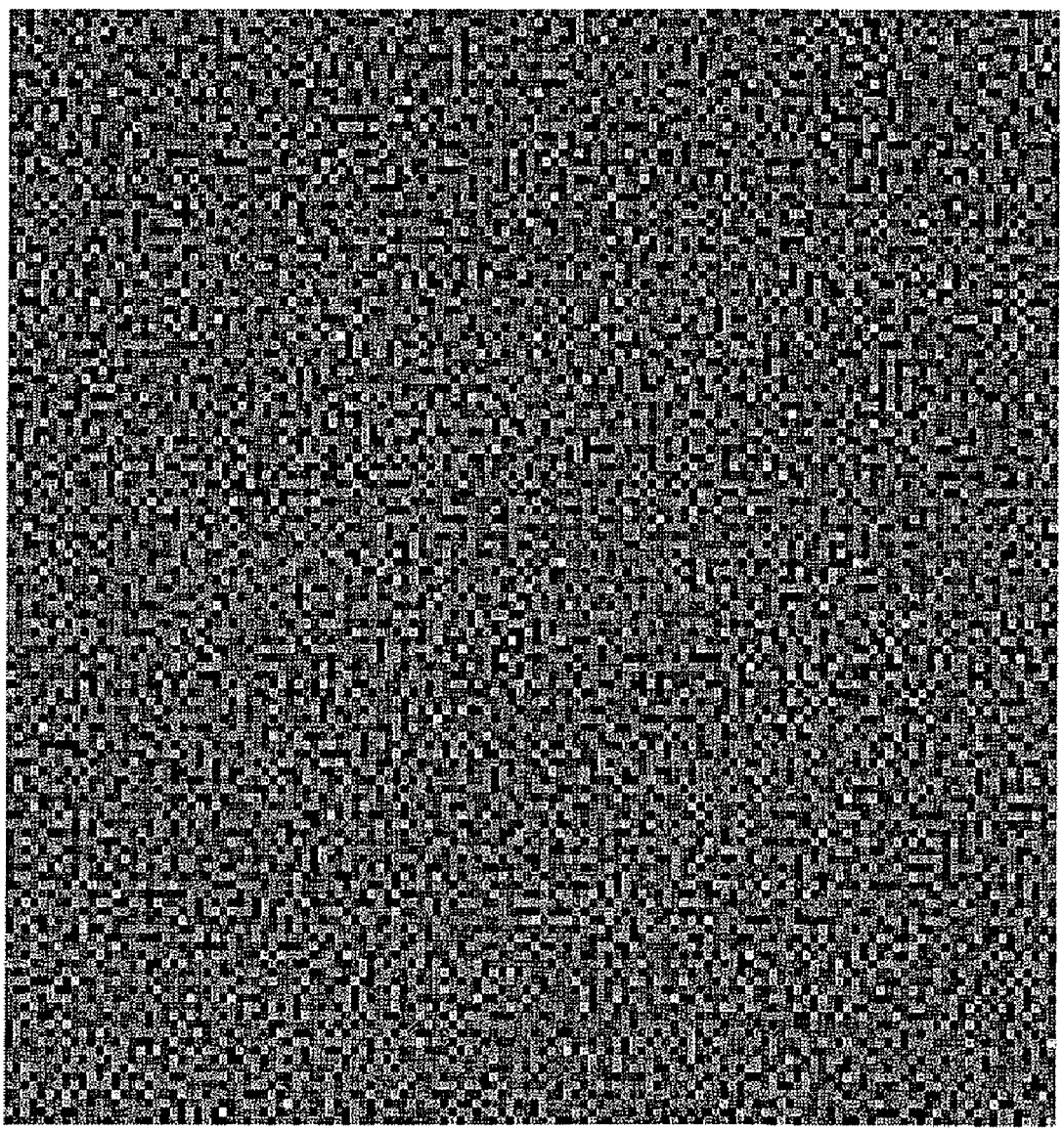
FIG. 15 is a view showing the arrangement of average threshold of three dither patterns when these dither patterns are displaced according to the first embodiment of the present invention.

FIG. 14 is a view showing an arrangement pattern of the average thresholds obtained when the layer dither patterns C and M displaced from each other are superposed, and FIG. 15 is a view showing an arrangement pattern of the average thresholds obtained when the layer dither patterns C, M, and Y displaced from each other are superposed. As clearly known from these figures, in the threshold average pattern obtained when the superposed positions of the dither patterns according to the embodiment are displaced, the dispersiveness deteriorates and rough-surface texture is felt.

Figure 16:
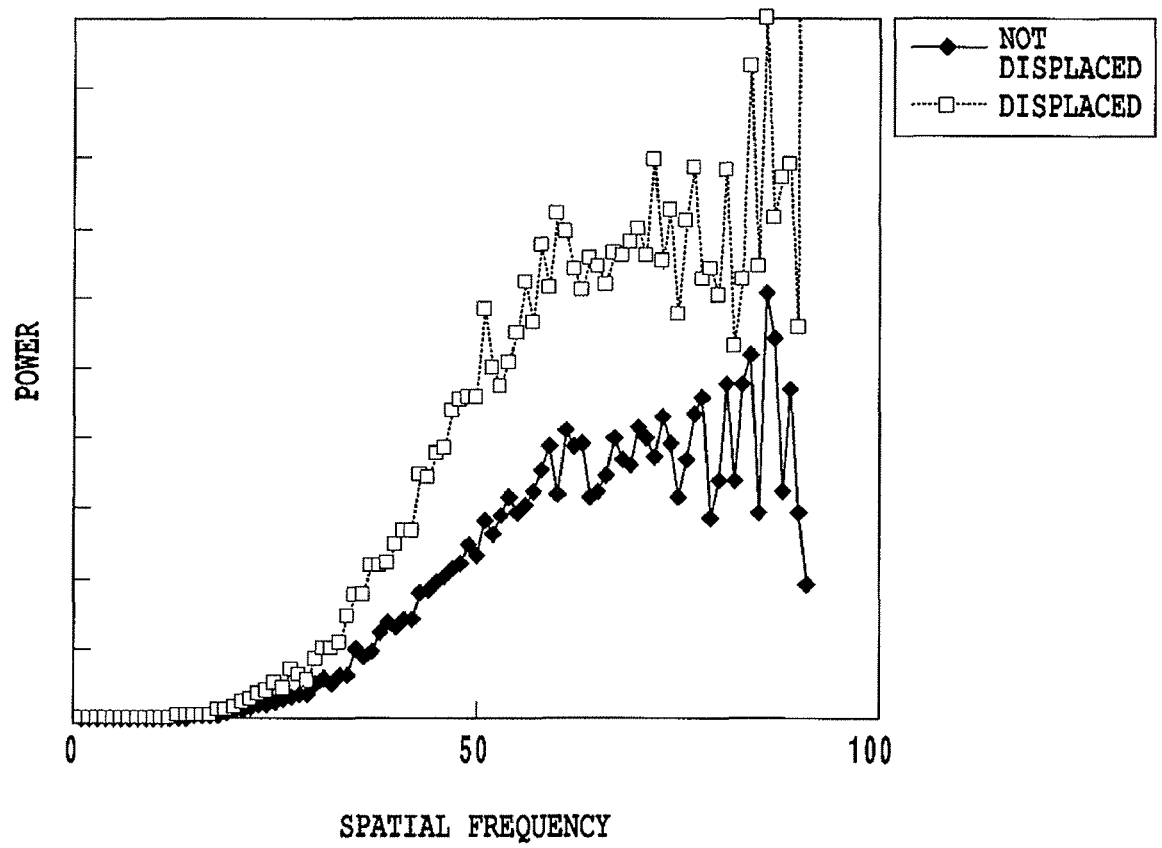
FIG. 16 is a view showing power spectra of average threshold of two dither patterns for each of the dither pattern according to the first embodiment of the present invention and the displaced dither pattern.
Figure 17:
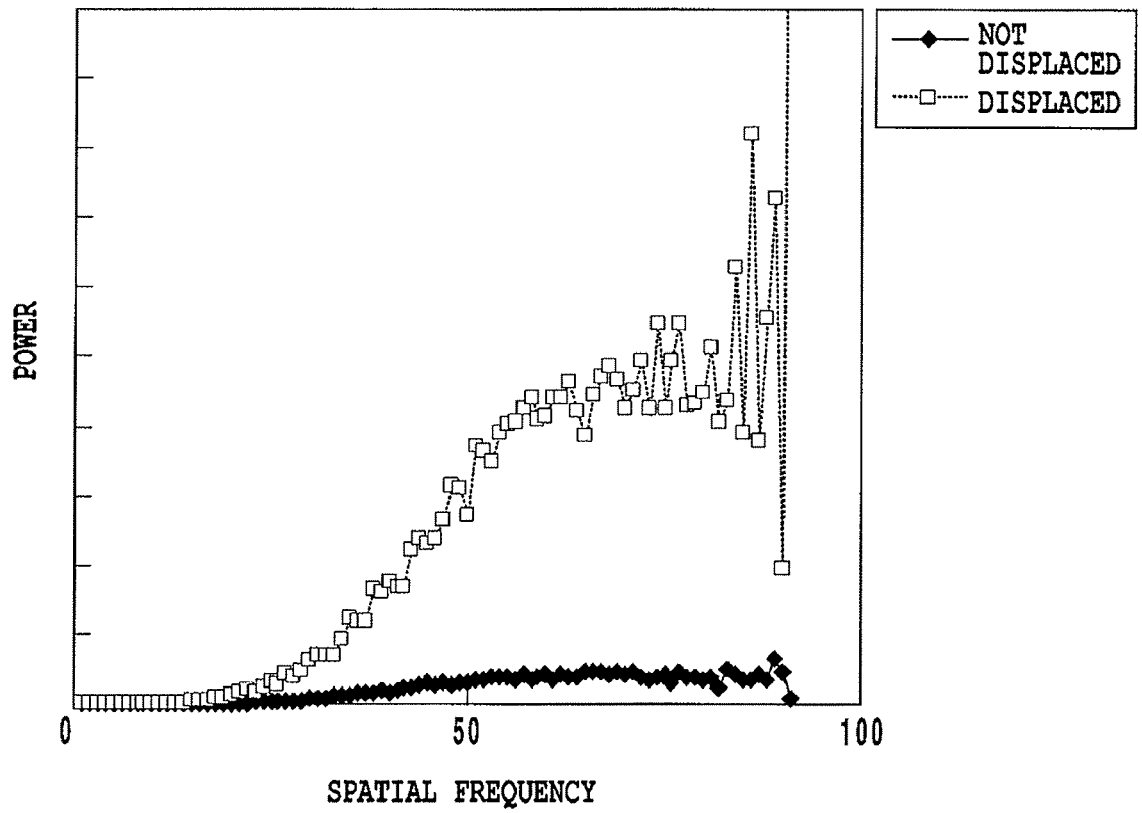
FIG. 17 is a view showing power spectra of average threshold of three dither patterns for each of according to the first embodiment of the present invention and the displaced dither pattern.

FIGS. 16 and 17 are views showing a comparison of power spectrum obtained when the superposed positions of the dither patterns are displaced and power spectrum obtained when the superposed positions of the dither patterns are not displaced (superposed at the regular position). These figures illustrate a power spectrum for the arrangement pattern of the average thresholds of the layer dither patterns C and M, and a power spectrum for the arrangement pattern of the average thresholds for the layer dither patterns C, M, and Y, according to the embodiment respectively.

For the layer dither patterns according to the embodiment shown in these figures, power increases in all the frequency ranges when the patterns are displaced and an amount of low frequency components becomes large compared with that in the case, in which the dither patterns are not displaced. As mentioned above, in the layer dither patterns, in which the dispersiveness is taken into consideration even across the different planes, the dispersiveness significantly deteriorates when the dither patterns are superposed in any other manner than the regular manner.

Figure 18:
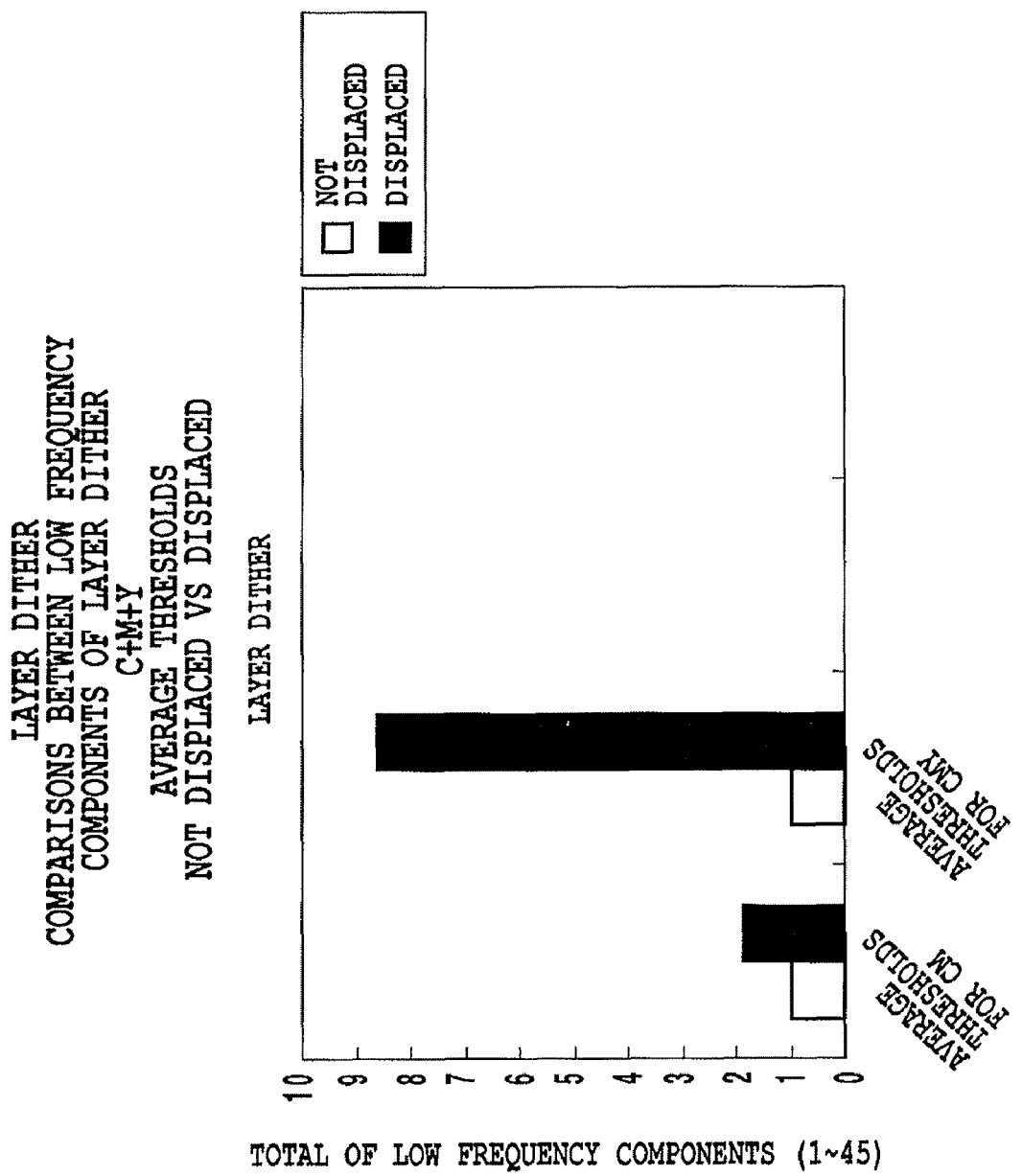
FIG. 18 is a view showing differences in low-frequency components for average threshold for each of the dither pattern according to the first embodiment of the present invention and the displaced dither pattern.

FIG. 18 is a view showing the result of the evaluation based on displacing the dither patterns mentioned above in the form of the amount of low frequency components. It also indicates a comparison of the amounts of low frequency components between the power spectrum of the arrangement pattern of the averages of the thresholds obtained when the layer dither patterns according to the embodiment are displaced each other and they are not displaced (the regular case).

As shown in FIG. 18, it is clear that for the layer dither patterns according to the embodiment, the amount of low frequency components increases in both the dither patterns C and M, and C, M, and Y when the patterns are displaced.

Evaluation Based on a Printed Image

Figure 24:
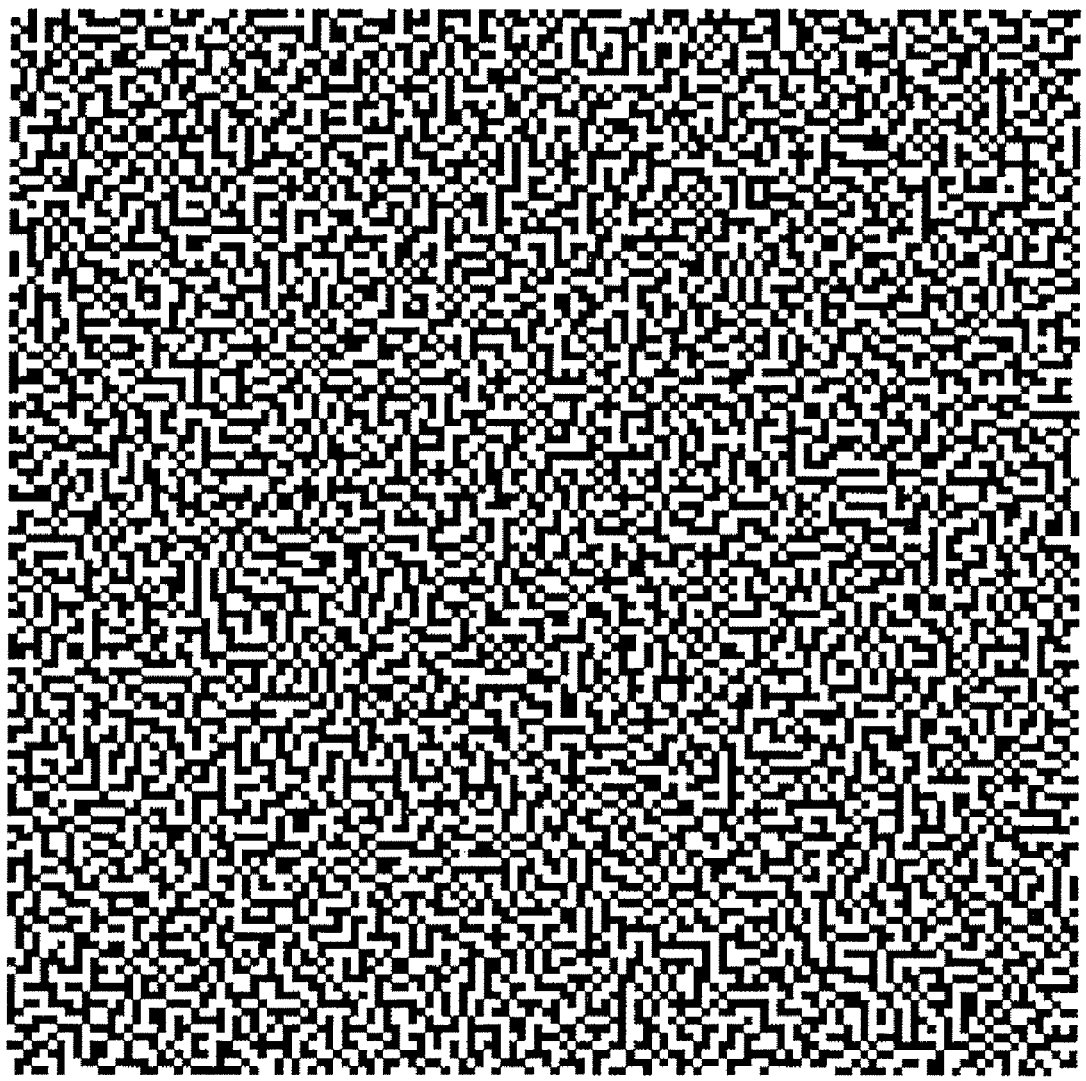
FIG. 24 is a view showing a logical product pattern for a dot pattern obtained by binarizing a uniform image using layer dither patterns C and M according to the embodiment of the present invention.
Figure 25:
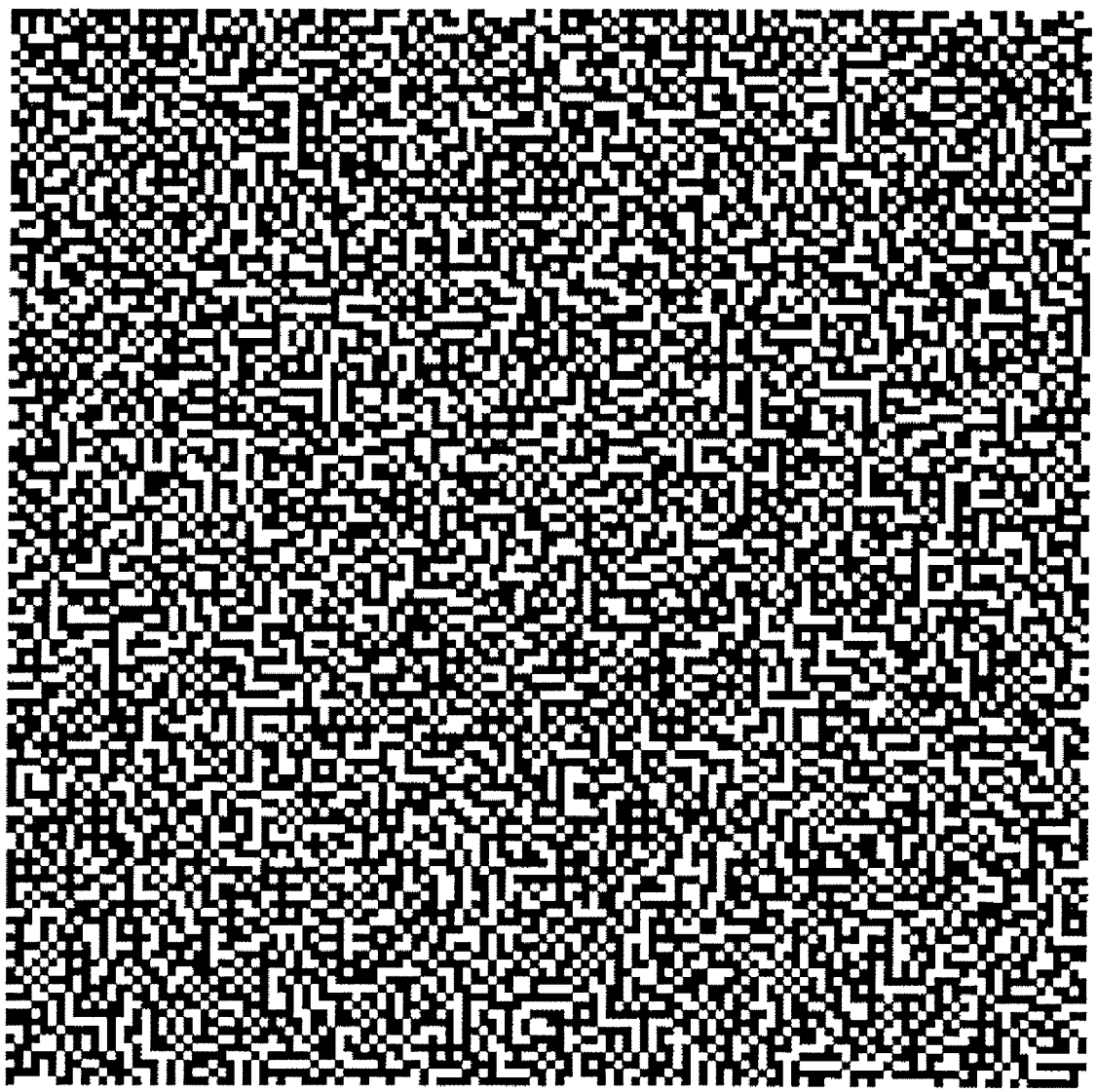
FIG. 25 is a view showing a logical product pattern for a dot pattern obtained by binarizing the uniform image using layer dither patterns C and M according to the conventional art.
Figure 26:
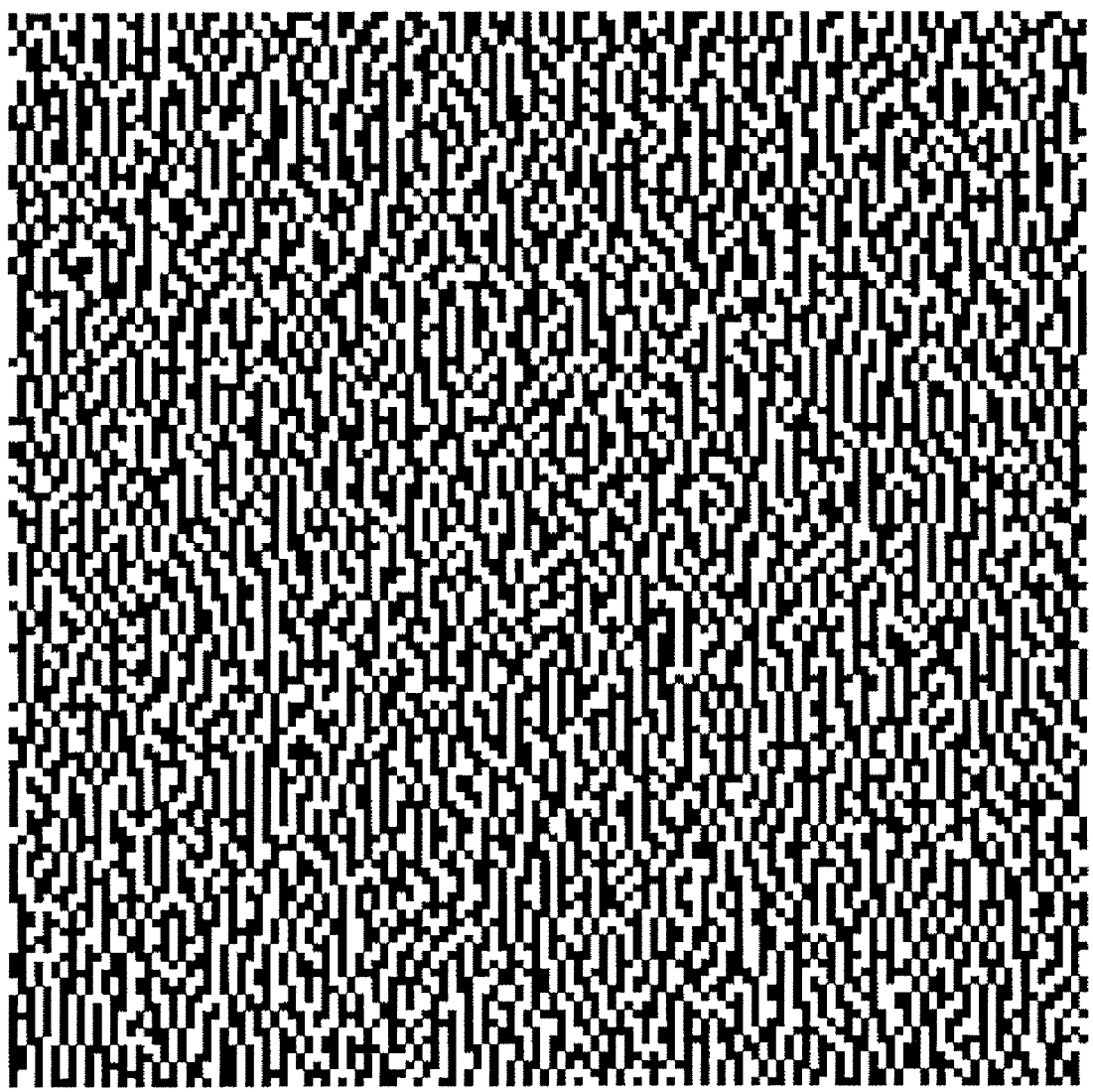
FIG. 26 is a view showing a logical product pattern for a dot pattern obtained by binarizing the uniform image using dither patterns C and M according to another conventional art.
Figure 27:
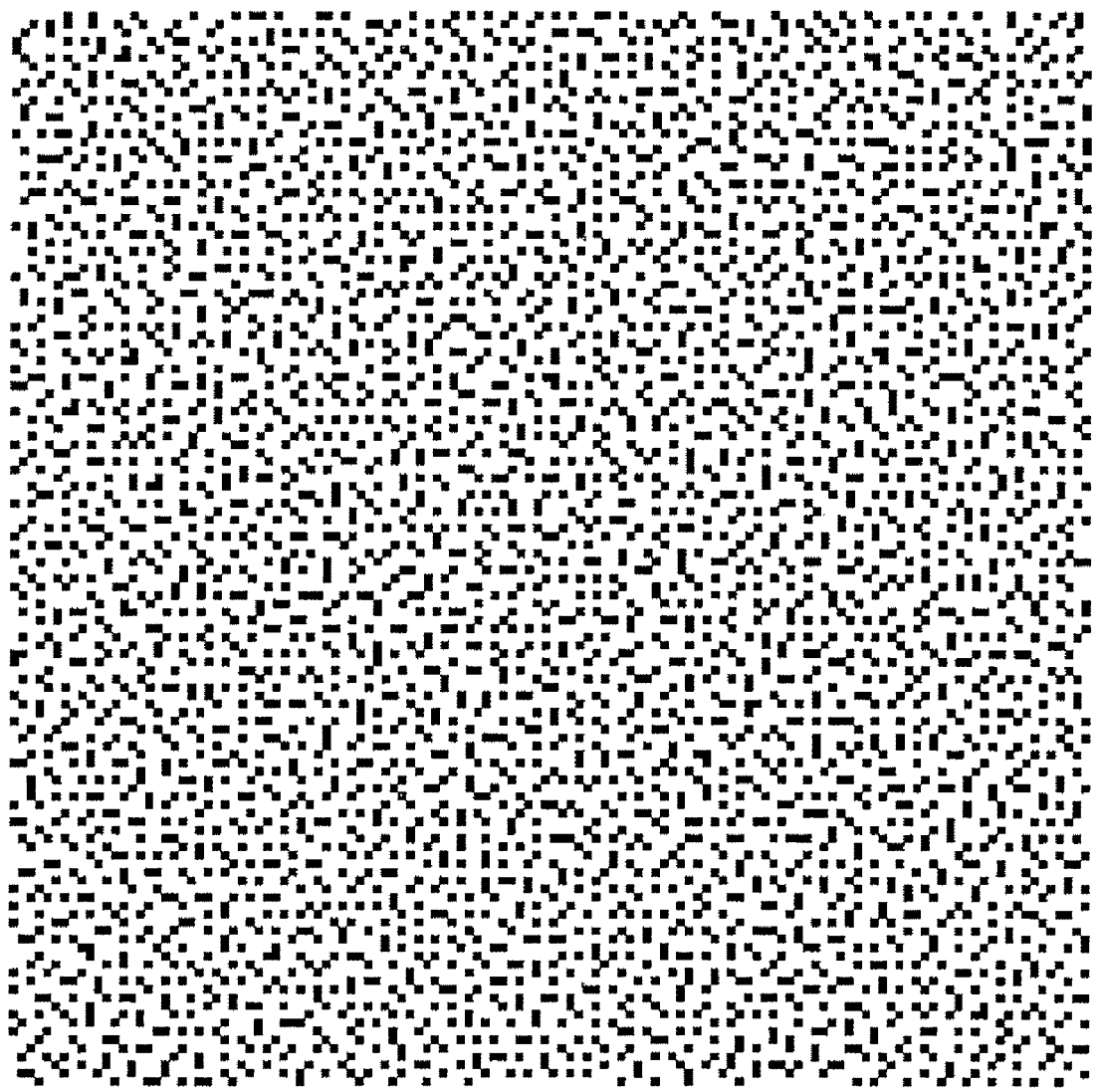
FIG. 27 is a view showing a logical product pattern for a dot pattern obtained by binarizing the uniform image using dither patterns C, M, and Y according to the embodiment of the present invention.

FIG. 24 is a view showing the logical product (AND) pattern of dot patterns obtained by actually binarizing a uniform image with a density of 64 using the layer dither patterns C and M according to the embodiment. FIG. 27 is a view showing the logical product (AND) pattern of dot patterns obtained by binarizing a uniform image with a density of 64 using the layer dither patterns C, M, and Y according to the embodiment. FIGS. 25 and 26 are views showing a logical product (AND) pattern of dot patterns obtained by binarizing a uniform image with a density of 64 using two dither patterns C and M according to the conventional art obtained by randomly displacing them and using two dither patterns C and M according to the conventional art obtained by displacing them at only one pixel, respectively.

As shown in FIGS. 24 and 27, the arrangement (AND) of superposed dot patterns obtained by two or three dither patterns according to the embodiment, in which overlapped dots are extracted from the dot arrangement, provides high dispersiveness with no rough-surface texture. As mentioned above, this is achieved by taking account of not only the dispersiveness of dots (the factor $\beta$) between two dither planes but also the dispersiveness of overlapped positions (the factor $\gamma s(n)$).

In contrast, for the logical product in which the dot patterns obtained by the dither patterns disclosed in Patent Documents 1 and 2 are superposed, the dispersiveness of the dot arrangement is worse than that of the pattern (FIG. 24) according to the embodiment, not depending on how displacing the patterns. As mentioned above, this is caused by the fact in the Patent Documents 1 and 2 that the dispersiveness of dots has been considered in the same plane but the dispersiveness (the factor $\beta$) of dots across the different planes and the dispersiveness of overlapped positions (the factor $\gamma_s(n)$) have not so.

Figure 28:
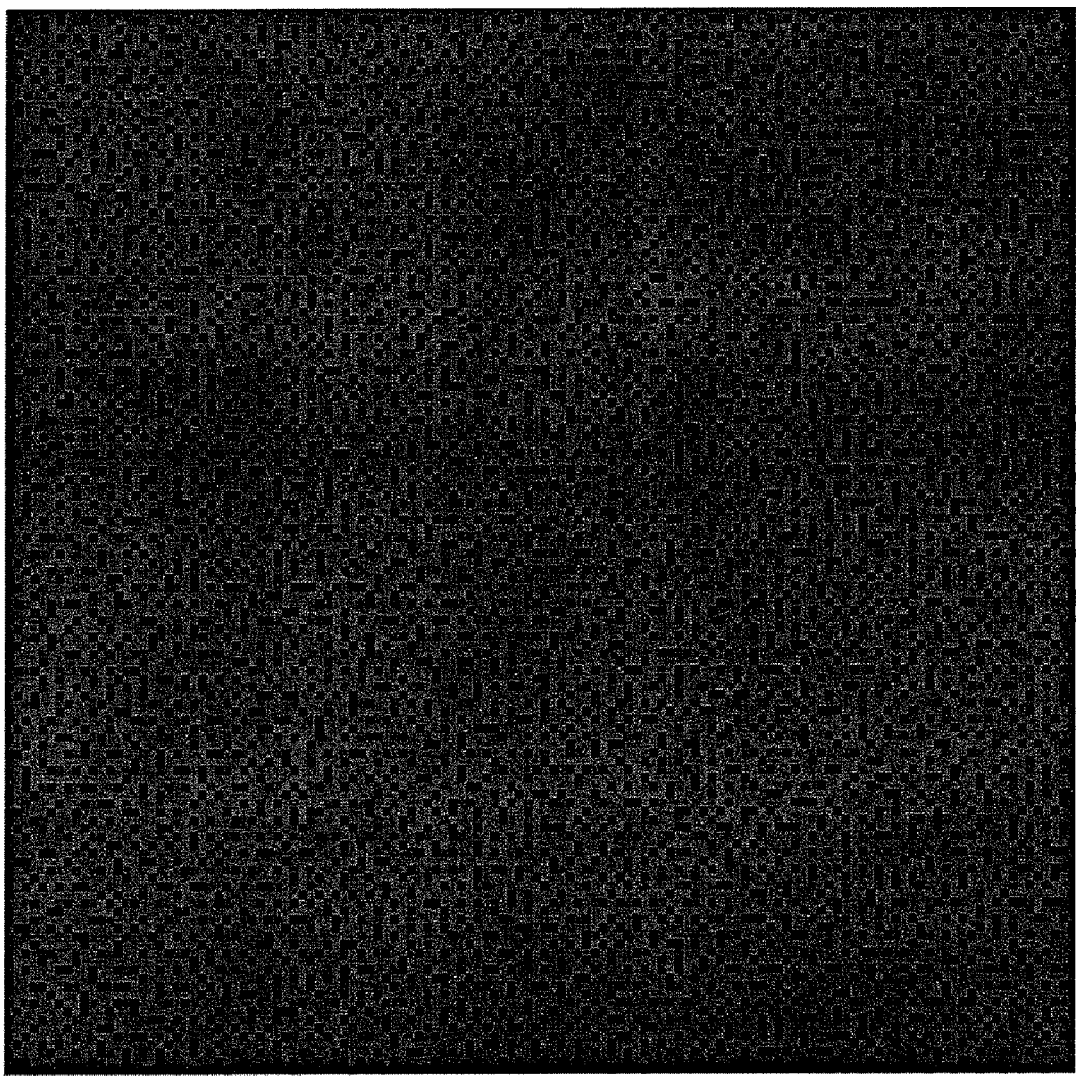
FIG. 28 is a view showing an "superposed" pattern for the dot patterns obtained by binarizing the uniform image using layer dither patterns C, M, and Y according to the embodiment of the present invention.

Herein, giving another example of the method for evaluating, the "superposed pattern" is used. The "superposed pattern" is generated using a plurality of dither patterns. For example, when a dot ("1") is present on the pixels of the dot patterns obtained by binarizing the uniform image with the density of 64, the superposed pattern is pattern in which data "1" indicating the dot is set to the value for its corresponding pixel and when the dots are overlapped at the same pixel, the value indicating the number of the overlapped dots is set. Assuming that when two dots are overlapped at the same pixel, data is set to "2" and when three dots are overlapped, data is set to "3". The pattern shown in FIG. 28 is represented at a density depending on the value indicated by the data. In the superposed pattern, the dot arrangement in each of the different planes is represented in one plane and the overlapped dot arrangement can be indicated with the degree of overlapping.

FIG. 28 is a view showing a "superposed" pattern at the time of superposing dot patterns obtained by binarizing the uniform image with the density of 64 using three layer dither patters according to the embodiment. The pattern shown in this figure represents a dot pattern similar to a superposed ink dot pattern when an image is printed using the dither patterns according to the embodiment. Accordingly, as clearly known from this pattern, the overlapped ink dots are appropriately dispersed.

Figure 29:
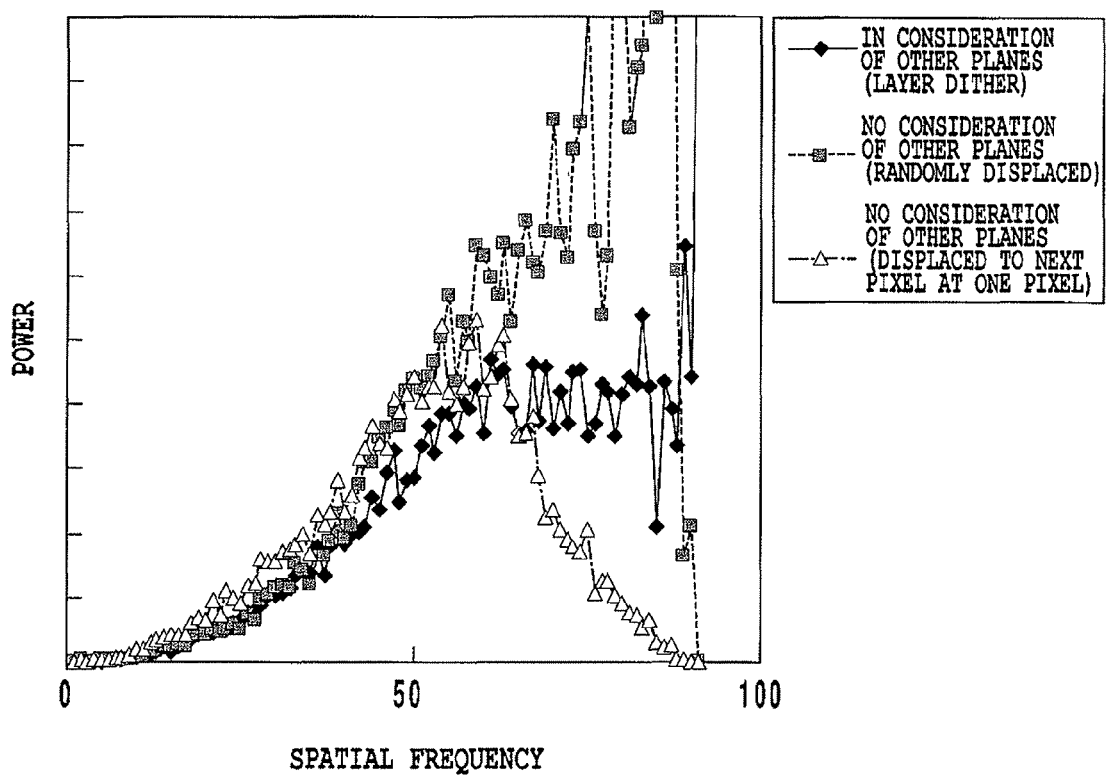
FIG. 29 is a view showing power spectra resulted from superposing of the dot patterns obtained by binarizing the uniform image using two dither patterns for each of the dither pattern according to the first embodiment of the present invention and the dither pattern is according to the conventional art.
Figure 30:
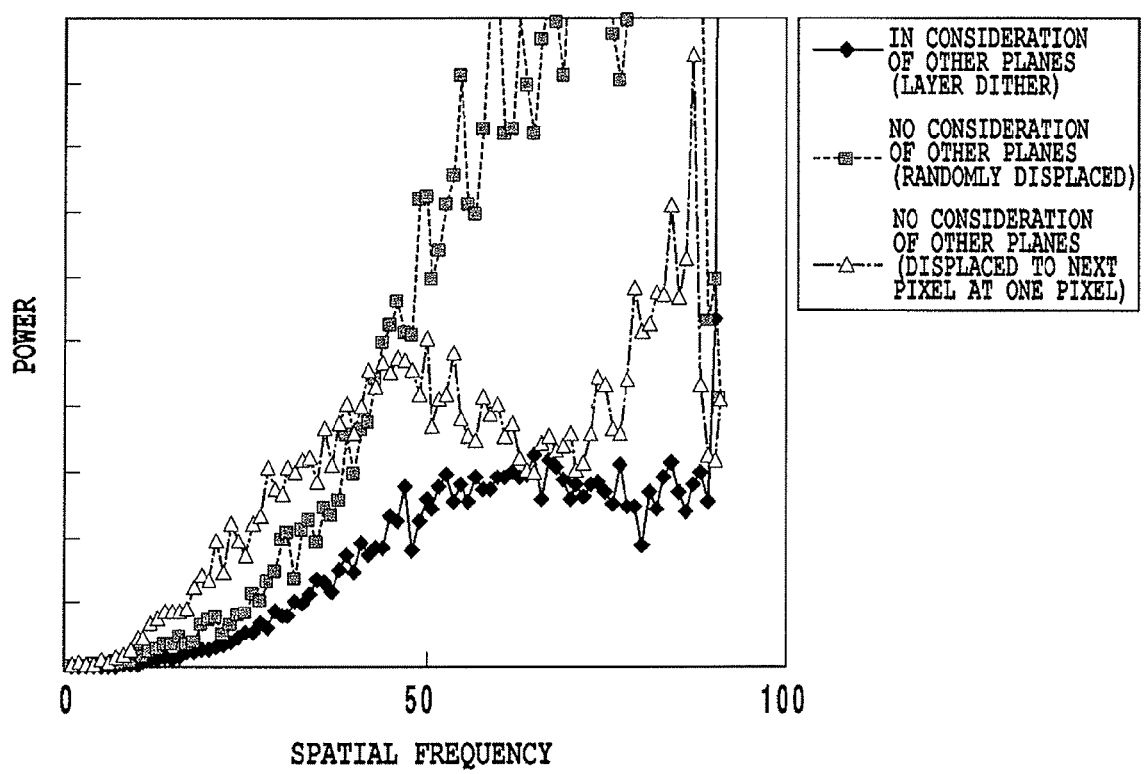
FIG. 30 is a view showing power spectra resulted from superposing of the dot patterns obtained by binarizing the uniform image using three dither patterns for each of the dither pattern according to the first embodiment of the present invention and the dither pattern according to the conventional art.

FIGS. 29 and 30 are views showing a comparison of power spectra for the superposed patterns obtained as mentioned above when the two or three dot patterns obtained by the layer dither patterns according to the embodiment and two or three dot patterns obtained by the dither patterns according to the two examples of conventional art mentioned above are superposed respectively.

Comparing among the three curves, it is made clear that an amount of low frequency components is larger in the respective superposed patterns by the respective dither patterns according to the two examples of conventional art than that of the superposed patterns by the layer dither pattern according to the embodiment. That is, rough-surface texture increases with poor dispersiveness.

Figure 31:
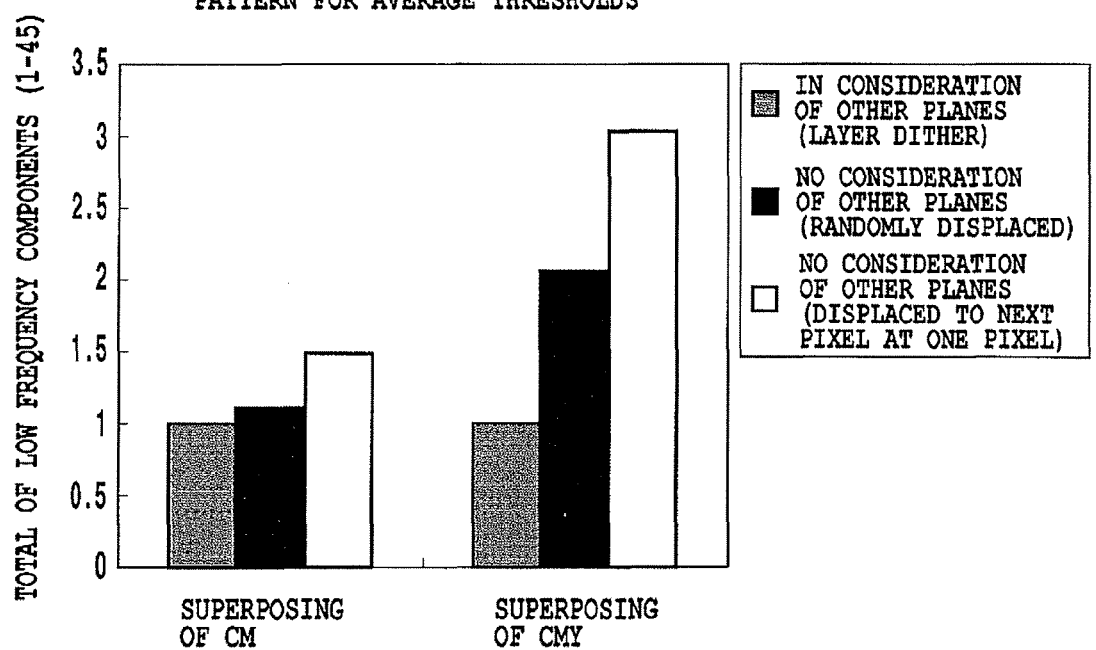
FIG. 31 is a view showing differences between low-frequency components of power spectra resulted from superposing of the dot patterns obtained by binarizing the uniform image using three dither patterns for each of the dither pattern according to the first embodiment of the present invention and the dither pattern according to the conventional art.
Figure 32:
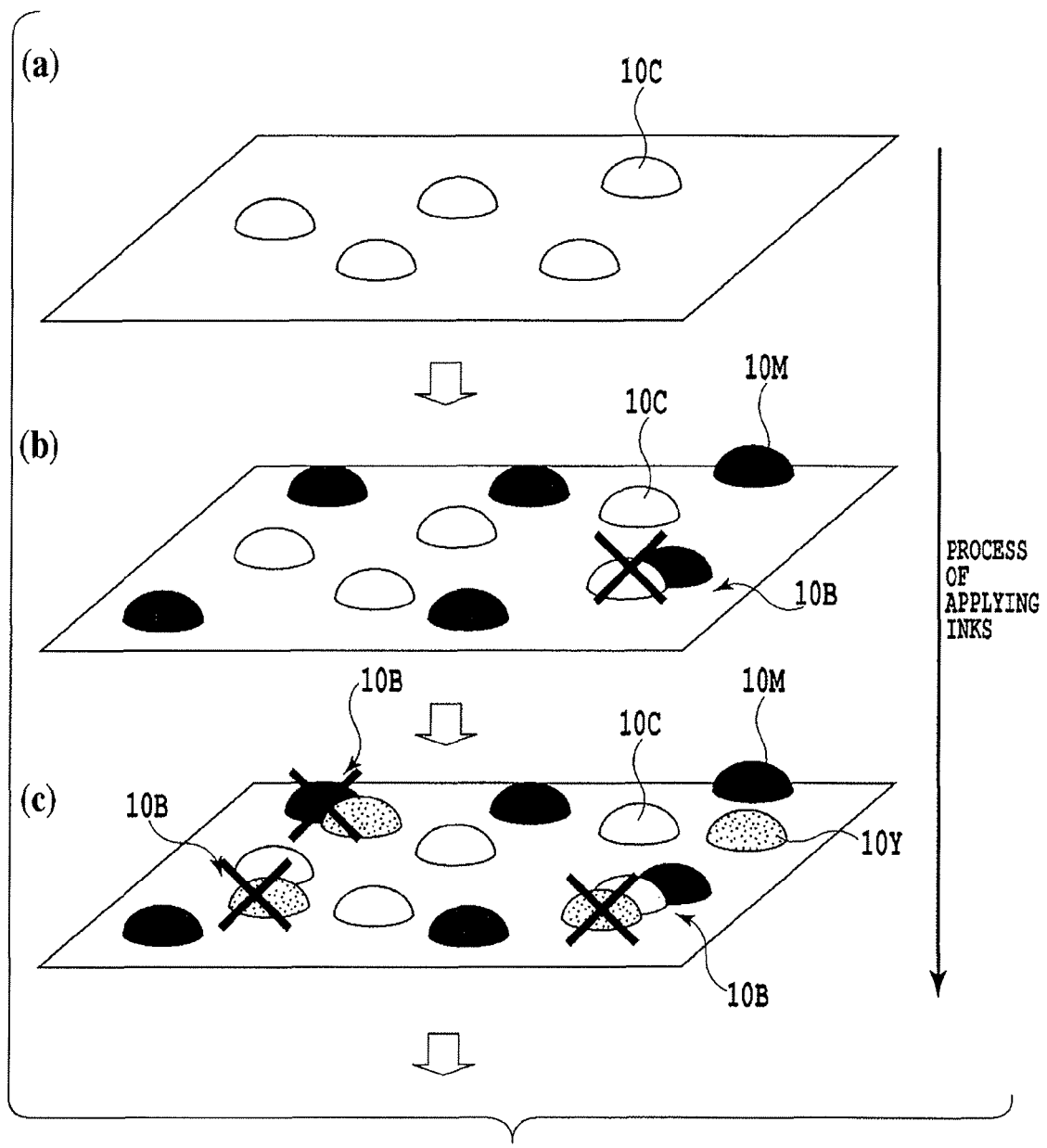
FIG. 32 is a view explaining problems with the conventional art.

FIG. 31 is a view showing a comparison of the amounts of low frequency components in power spectra among the superposed patterns obtained mentioned above when the two and three layer dither pattern according to the embodiment and the respective dither patterns according to the two examples of conventional art mentioned above are used.

As shown in the figure, the pattern obtained by that the respective patterns by the dither patterns according to the two conventional art are superposed, has a larger amount of low frequency components than that of the superposed pattern obtained by using the layer dither patterns according to the embodiment. That is, rough-surface texture increases with poor dispersiveness.

EMBODIMENT 2

The dither pattern may be changed to another dither pattern depending on the gradation value. More specifically, in the case that the dither patterns are generated as mentioned above in the embodiment, an image in which coverage rates of all of the three planes are 50%, is nice. On the other hand, an image with the coverage rates of three planes 50%, 25%, and 25% may have relatively deteriorated quality. It is because, for example, the dot distribution by the 25% threshold of magenta is generated under the influence of repulsive forces at which dot patterns are generated by using the 25% threshold patterns on other colors.

To address this problem, the individual dither patterns are generated depending on their duty and are switched for use. Specifically, the dither patterns of the three planes are generated at two stages. First, the dots are divided into quarters assuming 255 levels for one plane. In this case, they are divided into two generating stages 0 to 127 and 128 to 255. This enables it to be immediately calculated whether relative to the largest gradation value among three planes, the gradation values in the remaining two planes are more than ½ times it.

Assuming that the averages of the gradation values of an image in processing are 200 for the first plane, 150 for the second plane, and 50 for the third plane, respectively, a dither pattern indicated by (1,1,0) is selected. In this case, the dither pattern of (1,1,0) represents the dither pattern, in which the initial dot patterns are generated as an initial binary image formed at the level 128/255 in the first plane, an initial binary image formed at the level 128/255 in the second plane, and an initial binary image formed at the level 64/255 in the third plane. After dots are arranged while repulsive force potentials are applied, two dots are thinned from the first and second planes and one dot is thinned from the third plane.

OTHER EMBODIMENTS

According to the present invention, the layer dither patterns in relation to the embodiments mentioned above may be applied to all of a plurality kind of ink used in a printing apparatus, or may be applied only to some combinations of the plurality kind of ink used in the printing apparatus.

For example, six colors of ink, cyan (C), magenta (M), yellow(Y), black (B), light cyan (Lc), and light magenta (Lm), are used. The layer dither patterns may be applied to all the colors of ink. In this case, six colors of layer dither patterns are to be generated by the method for generating mentioned above in relation to the aforementioned embodiments.

On the other hand, among these six colors, some combinations of colors (two, three, four or five colors) may be applied to the layer dither patterns. In this case, two aspects are considered. In the first aspect, the layer dither patterns are generated for some colors mentioned above and no layer dither pattern is generated for the remaining colors. For example, the layer dither patterns are generated only for three colors (for example, C, M, and Y) among six colors by the method mentioned in relation to the abovementioned embodiments and the dither patterns are generated for the remaining three colors (K, Lc, Lm) using any of known methods. In the second aspect, the layer dither patterns are generated for some colors and the selected ones out of the dither patterns generated for the abovementioned some colors are applied to the remaining colors. For example, for three colors C, M, Y among six colors, the layer dither patterns are generated using the method mentioned in relation to the aforementioned embodiments and for the remaining three colors (K, Lc, Lm), the layer dither patterns are selected among those generated for C, M, Y.

In relation to the aforementioned embodiments, the cases, in which the layer dither patterns are applied to some combinations of different ink colors, have been mentioned so far but the present invention is not limited to these aspects. The present invention may be applied to the aspect, in which images are printed using dots with the same color but different dot sizes (the same colors of ink with different discharging volume). In this case, the aforementioned layer dither patterns may be applied to the dots (large or small dots) with the same color but different dot sizes. For example, it is assumed that six kinds of dots, large cyan, small cyan, large magenta, small magenta, yellow, and black, are used. In this case, the layer dither patterns are generated for two colors, large and small cyan or large and small magenta using the aforementioned method mentioned above in relation to the embodiments.

Furthermore, according to an aspect, in which dots with the same color but different sizes (for example, large and small dots) may be used, the aforementioned layer dither patterns are applied to some combinations of dots with different colors and the same dither pattern may be applied to some combinations of dots with the same color but different sizes. For example, if the aforementioned six kinds of dots are used, the layer dither patterns generated using the method mentioned in relation to the aforementioned embodiments are generated for large and small cyan, the same dither pattern as that of large cyan is applied to small cyan, and the same dither pattern as that of large magenta is applied to small magenta.

In should be noted that the kinds of dots with the same color but different sizes are not limited to two sizes, large and small but may be applied to three sizes, large, middle, and small and so on. The effects of the present invention are fulfilled not only for dots with different colors or sizes but also for ink of the same color, which is delivered from a group of nozzles arranged at a fixed interval at different timings. For example, according to an aspect, in which a group of nozzles are arranged along the main scanning axis in the order of CMYMC, the layer dither patterns generated using the aforementioned method may be applied to the group of nozzles (a group of C nozzles and a group of M nozzles) of the same color arranged at a fixed interval.

Furthermore, the present invention may be applied to an aspect, in which any liquid is used other than ink, as mentioned above. The liquid other than ink includes a reaction liquid that aggregates or insolubilizes color materials in ink. In this case, the layer dither patterns generated using the method mentioned in relation to the aforementioned embodiments for at least a given kind of ink and reaction liquid.

According to the present invention, dye ink containing a dye as a color material, pigment ink containing a pigment as a color material, mixed ink containing both a dye and a pigment as color materials may be used.

Other Embodiments

According to the embodiments of the present invention, the dither patterns, when displaced, are evaluated in the area of 128 (in width)×128 (in length) pixels. On the other hand, some dither patterns may have different sizes in width and length. Accordingly, before the frequency components for these patterns are obtained, the exact sizes of the area in width and length are required to be prepared. With the small size in length (for example, 256×128), a pattern is repeated vertically to align the shorter size to the longitudinal size (in this case, 256 pixels in the horizontal direction) and the frequency components are evaluated in the pattern of 256×256 pixels.

Similarly for the patterns with different sizes from this pattern, the sizes in width and length of a pattern are aligned to the longitudinal size to evaluate frequency components. Specifically, a pattern is repeated until the shorter size becomes longer than the longitudinal size and the desired pattern is cut out for evaluation. In this case, the vertical and horizontal sizes are preferably an $n^{th}$ power of 2 (a positive integer) so that Furrier Transform is executed in converting frequencies. If it is not an $n^{th}$ power of 2, an $n^{th}$ power of 2 closest to the longitudinal size is identified and the pattern is repeated vertically and horizontally so that the pattern with the $n^{th}$ power of 2 is cut out. The identified pattern with the $n^{th}$ power of 2 is cur out for evaluation. For example, it is assumed that the size of a dither pattern is 500 (in width)×320 (in length) pixels. In this case, since the longitudinal size is "500", the $n^{th}$ power of 2 closest to "500" is identified. In this case, the $n^{th}$ power of 2 closest to "500" is assumed to be "512". To cut out a pattern of 512×512 pixels, a patter is repeated horizontally once and vertically once to form a pattern of 1000×640 pixels. A pattern of 512×512 pixels is cut out from the resultant pattern of 1000×640 pixels for evaluation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a continuation application of PCT application No. PCT/JP2005/012513 under 37 Code of Federal Regulations § 1.53 (b) and the said PCT application claims the benefit of Japanese Patent Application Nos. 2004-199623, filed Jul. 6, 2004 and 2005-197874 filed Jul. 6, 2005, which are hereby incorporated by reference herein in their entirety.

The invention claimed is:

1. A method, to be executed on a computer, of generating a plurality of dither patterns, said method comprising:
a first determining step of determining an arrangement of a plurality of different threshold values in a first dither pattern that is used for generating quantized data for performing printing of a first color; and
a second determining step of determining an arrangement of a plurality of different threshold values in a second dither pattern that is used for generating quantized data for performing printing of a second color,
wherein said first determining step includes a step of determining an arrangement of a predetermined number of identical threshold values in a first candidate position pattern of a plurality of candidate positions in which the threshold values are to be positioned, the first candidate position pattern corresponding to the first dither pattern, based on a second candidate position pattern of a plurality of candidate positions in which the threshold values are to be positioned, the second candidate position pattern corresponding to the second dither pattern,
wherein said second determining step includes a step of determining an arrangement of a predetermined number of identical threshold values in the second candidate position pattern, based on the first candidate position pattern, and
wherein said first and second determining steps respectively include a step of repeating said step of determining the arrangement of the predetermined number of identical threshold values, sequentially for each different threshold value of the plurality of different threshold values, and in said repeating step, the first and second candidate position patterns corresponding to the candidate positions in which the threshold values have been positioned, are omitted from being the next first and second candidate position patterns, respectively.

2. The method according to claim 1, wherein said first and second determining steps respectively repeat determining of the arrangement of one threshold value based on the second and first candidate position patterns, respectively, and determining of the arrangement of a next one threshold value based on the second and first candidate position patterns, respectively, from which the candidate positions in which the threshold values which have been positioned are omitted to determine the arrangement of the predetermined identical threshold values.

3. The method according to claim 1, wherein, in each of the first and second candidate position patterns which is used for a first time in said step of repeating, the candidate positions are arranged in positions less than 100% of possible positions in which the threshold values are positioned,
the arrangement of the candidate positions in the first candidate position pattern of the first time is determined based on the arrangement of the candidate positions in the second candidate position pattern of the first time, and
the arrangement of the candidate positions in the second candidate position pattern of the first time is determined based on the arrangement of the candidate positions in the first candidate position pattern of the first time.

4. The method according to claim 1, wherein said step of determining the arrangement of the threshold values in said first determining step includes a step of, when one threshold value is to be positioned in the candidate position, calculating a repulsive force potential between the candidate position in which the one threshold value is to be positioned, and other candidate positions in the first candidate position pattern and candidate positions in the second candidate position pattern, for each of the candidate positions, and said step of determining the arrangement of the threshold values in said second determining step includes a step of, when one threshold value is to be positioned in the candidate position, calculating a repulsive force potential between the candidate position in which the one threshold value is to be positioned, and other candidate positions in the second candidate position pattern and candidate positions in the first candidate position pattern, for each of the candidate positions.

5. The method according to claim 1, wherein said first determining step including a step of determining an arrangement of a predetermined number of identical threshold values in the first candidate position pattern based on the second candidate position pattern, so that a low frequency component of a pattern obtained by a logical sum of the first and second candidate position patterns is made smaller, and said second determining step including a step of determining an arrangement of a predetermined number of identical threshold values in the second candidate position pattern based on the first candidate position pattern, so that a low frequency component of a pattern obtained by a logical sum of the first and second candidate position patterns is made smaller.

6. The method according to claim 1, wherein said first determining step including a step of determining an arrangement of a predetermined number of identical threshold values in the first candidate position pattern based on the second candidate position pattern, so that a low frequency component of a pattern obtained by a logical product of the first and second candidate position patterns is made smaller, and said second determining step including a step of determining an arrangement of a predetermined number of identical threshold values in the second candidate position pattern based on the first candidate position pattern, so that a low frequency component of a pattern obtained by a logical product of the first and second candidate position patterns is made smaller.

7. A data processing apparatus comprising:

a memory storing a plurality of dither patterns generated by:

a first determining step of determining an arrangement of a plurality of different threshold values in a first dither pattern that is used for generating quantized data for performing printing of a first color; and a second determining step of determining an arrangement of a plurality of different threshold values in a second dither pattern that is used for generating quantized data for performing printing of a second color, wherein said first determining step includes a step of determining an arrangement of a predetermined number of identical threshold values in a first candidate position pattern of a plurality of candidate positions in which the threshold values are to be positioned, the first candidate position pattern corresponding to the first dither pattern, based on a second candidate position pattern of a plurality of candidate positions in which the threshold values are to be positioned, the second candidate position pattern corresponding to the second dither pattern, wherein said second determining step includes a step of determining an arrangement of a predetermined number of identical threshold values in the second candidate position pattern, based on the first candidate position pattern, and wherein said first and second determining steps respectively include a step of repeating said step of determining the arrangement of the predetermined number of identical threshold values, sequentially for each different threshold value of the plurality of different threshold values, and in said repeating step, the first and second candidate position patterns corresponding to the candidate positions in which the threshold values have been positioned, are omitted from being the next first and second candidate position patterns, respectively; and a processor configured to perform a quantizing process by using the plurality of dither patterns stored in the memory.

* * * * *